US006826540B1

(12) United States Patent
Plantec et al.

(10) Patent No.: US 6,826,540 B1
(45) Date of Patent: Nov. 30, 2004

(54) VIRTUAL HUMAN INTERFACE FOR CONDUCTING SURVEYS

(75) Inventors: Peter M. Plantec, Beverly Hills, CA (US); Michael L. Mauldin, Irwin, PA (US); Jeremy Shay Romero, Covina, CA (US); Aaron J. McBride, Sacramento, CA (US)

(73) Assignee: Virtual Personalities, Inc., Los Angeles, CA (US)

( * ) Notice: Subject to any disclaimer, the term of this patent is extended or adjusted under 35 U.S.C. 154(b) by 0 days.

(21) Appl. No.: 09/474,518

(22) Filed: Dec. 29, 1999

(51) Int. Cl.[7] ............................................. G06F 17/60
(52) U.S. Cl. ......................................... 705/10; 345/706
(58) Field of Search ............................ 705/10; 345/706

(56) References Cited

U.S. PATENT DOCUMENTS

| | | | |
|---|---|---|---|
| 3,748,750 A | | 7/1973 | Viemeister |
| 4,825,045 A | * | 4/1989 | Humble ....................... 235/383 |
| 4,982,346 A | * | 1/1991 | Girouard et al. .............. 705/14 |
| 5,317,688 A | | 5/1994 | Watson et al. |
| 5,367,454 A | * | 11/1994 | Kawamoto et al. ......... 345/706 |
| 5,429,361 A | | 7/1995 | Raven et al. |
| 5,583,763 A | | 12/1996 | Atcheson et al. |
| 5,630,017 A | | 5/1997 | Gasper et al. .............. 704/276 |
| 5,676,551 A | | 10/1997 | Knight et al. |

(List continued on next page.)

FOREIGN PATENT DOCUMENTS

| | | |
|---|---|---|
| EP | 0 993 197 A2 | 4/2000 |
| FR | 2 719 401 | 11/1995 |
| JP | 04 205368 | 7/1992 |
| WO | 96/05685 | 2/1996 |
| WO | 98/55903 | 12/1998 |
| WO | 99/35600 | 7/1999 |

OTHER PUBLICATIONS

A copy of PCT International Search Report, mailed on Jun. 12, 2001.
ZDNet, "WebSurv v1.0," Aug. 11, 1999.
Tim Beardsley, *Here's Looking at You*, News and Analysis.
Darwin 3D Software Creation, *Research and Development Results for use in Publisher's Final Design Specification of the Verbot Display Engine*.
Larry Armstrong, *Assistants for the Digital Lifestyle*, Business Week, p. 176, 178, Nov. 1998.
Loren G. Terveen & La Tondra Murray, *Helping Users Program Their Personal Agents*, Common Group CHI 96 Conference Proceedings, Conference on Human Factors in Computing Systems, p. 355–361, Apr. 13–18, 1996.
Weiguang Shao, Wei–Tek Tsai, Sanjai Rayadurgam & Robert Lai, *An Agent Architecture for Supporting Individualized Services in Internet Applications*, IEEE, p. 140–147, 1998.
Michael N. Huhns & Munindar P. Singh, *Personal Assistants*, IEEE Internet Computing, p. 90–92,Sep.–Oct. 1998.

(List continued on next page.)

*Primary Examiner*—Tario R. Hapiz
*Assistant Examiner*—Catherine M. Colón
(74) *Attorney, Agent, or Firm*—Knobbe Martens Olson & Bear LLP

(57) ABSTRACT

A virtual human interface application for conducting surveys comprises a system and method which include a script file which may include survey question data, response pattern data, advertising data, entertainment data, lobbying data and/or processing instructions. The system and method include an image generator providing a representation of a character communicating data from the script file, and also include script and response processing modules to seek and/or clarify responses from a user as well as to advertise to the user, persuade the user, encourage or reward the user, possibly based on patterns detected in the user's responses. The system and method automate the distribution of survey questions, the collection of survey data and processing and formatting of survey results.

15 Claims, 18 Drawing Sheets

U.S. PATENT DOCUMENTS

| | | | |
|---|---|---|---|
| 5,682,469 | A | 10/1997 | Linnett et al. |
| 5,721,827 | A | 2/1998 | Logan et al. |
| 5,726,688 | A | 3/1998 | Siefert et al. |
| 5,727,950 | A | 3/1998 | Cook et al. |
| 5,732,232 | A | 3/1998 | Brush, II et al. |
| 5,748,191 | A | 5/1998 | Rozak et al. |
| 5,774,720 | A | 6/1998 | Borgendale et al. |
| 5,790,789 | A | 8/1998 | Suarez |
| 5,799,298 | A | 8/1998 | Bingham et al. |
| 5,819,243 | A | 10/1998 | Rich et al. |
| 5,832,189 | A | 11/1998 | Tow |
| 5,832,454 | A | 11/1998 | Jafri et al. |
| 5,835,768 | A | 11/1998 | Miller et al. |
| 5,854,923 | A | 12/1998 | Dockter et al. |
| 5,867,226 | A | 2/1999 | Wehmeyer et al. |
| 5,875,327 | A | 2/1999 | Brandt et al. |
| 5,884,029 | A | 3/1999 | Brush, II et al. |
| 5,892,536 | A | 4/1999 | Logan et al. |
| 5,893,075 | A * | 4/1999 | Plainfield et al. ............. 705/14 |
| 5,907,706 | A | 5/1999 | Brodsky et al. |
| 5,920,848 | A | 7/1999 | Schutzer et al. |
| 5,926,207 | A | 7/1999 | Vaughan et al. |
| 5,995,119 | A * | 11/1999 | Cosatto et al. ............. 345/473 |
| 6,031,549 | A * | 2/2000 | Hayes-Roth ............... 345/474 |
| 6,088,731 | A | 7/2000 | Kiraly et al. ............... 709/229 |
| 6,314,410 | B1 * | 11/2001 | Tackett et al. ............... 706/11 |
| 6,340,977 | B1 * | 1/2002 | Lui et al. .................... 345/709 |
| 6,363,301 | B1 * | 3/2002 | Tackett et al. .............. 700/246 |
| 6,535,215 | B1 * | 3/2003 | DeWitt et al. .............. 345/473 |
| 2002/0005865 | A1 * | 1/2002 | Hayes-Roth ............... 345/706 |

OTHER PUBLICATIONS

H.C. Lee & Cihan H. Dagli, *A Cyber Agent on the World Wide Web,* SPIE vol. 2760 p. 516–522.

Sanya Mitaim & Bart Kosko, *Fuzzy Function Approximation and Intelligent Agents,* SPIE vol. 3165 p. 2–13.

Ping–Jer Yeh, Shyan–Ming Yuan & Winston Lo, *Two–Level Web Agent for Limited Accessibility,* IEEE Computer Society, p. 482–485, Aug. 13–15, 1997.

Don Gilbert & Peter Janca, *Intelligent Usability Enhancers,* 19thAnnual Pacific Telecommunications Conference (Hawaii), p. 677–682, Jan. 19–22, 1997.

R. William Maule, *Cognitive maps, AI agents and personalized virtual environments in Internet learning experiences,* Internet Research: Electronic Networking Applications and Policy, vol. 8 No. 4 p. 347–358, 1997.

Tom Mitchell, Rich Caruana, Dayne Freitag, John McDermott & David Zabowski, *Experience with a learning Personal Assistant,* Communications of the ACM, vol. 37 No. 7 p. 81–91, Jul. 1994.

Sandip Sen, Thomas Haynes & Neeraj Arora, *Satisfying user preferences while negotiating meetings,* Academic Press Limited, p. 407–427, 1997.

Pattie Maes, *Agents that Reduce work and information overload,* Communications of the ACM, vol. 37 No. 7 p. 31–40, Jul. 1994.

* cited by examiner

Galaxy Network Daily Statistics Page For:

VPI Real-Time
Reponse Tabulator
Running Statistics for ABC
Productions: 12/22/00

Viewers are currently rating yesterday's show:

How Did You Like Quiet Waters?

| Strong Positive | Weak Positive | Neutral | Weak Negative | Strong Negative | #Respondents |
|---|---|---|---|---|---|
| 3% | 8% | 64% | 24% | 1% | 8,422 |

How Did You Like Sex In the City?

| 12% | 13% | 21% | 34% | 30% | 8,221 |

What Is Your Favorite Coffee?

| Starbucks | Maxwell House | MJB | House | Gourmet | # Respondents |
|---|---|---|---|---|---|
| 60% | 12% | 15% | 9% | 4% | 9,101 |

The content of this page will change daily or new pages will be posted for each new survey. There will be a running "percentage of universe" figure for each respondent pool.

FIG. 4

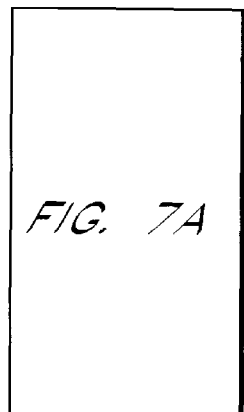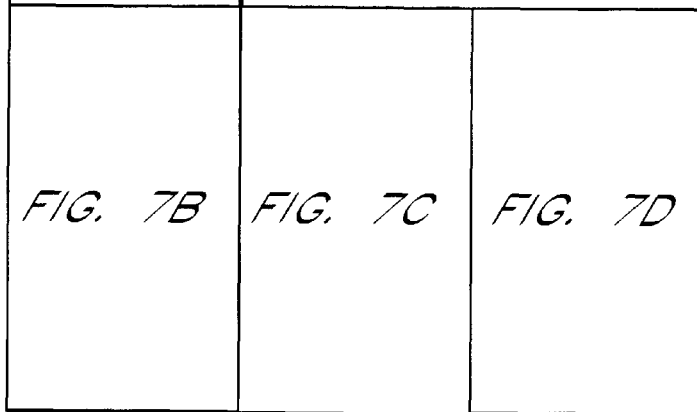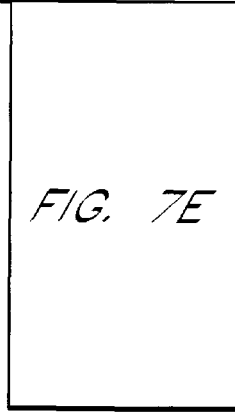
FIG. 7

VIRTUAL HUMAN INTERFACE FOR CONDUCTING SURVEYS

BACKGROUND OF THE INVENTION

1. Field of the Invention

The present invention relates in general to electronic information gathering, and more particularly to the use of a virtual human interface to conduct surveys and collect and present survey results data.

2. Description of the Related Art

Marketing and planning of all sorts is often critically dependent on customer and/or public feedback. In the context of product planning, such information can avoid the devastating effect of introducing a product the public simply does not want, is not ready for, or even a product the public finds offensive. In another context, media producers, such as those producing television series, are constantly wary of the effect on the consuming public that might be created by particular plots, changes in plots or treatment of certain issues, roles or characters. In addition, producers need to be aware of viewer preferences for use in attracting advertising. In these and other areas, accurate and timely consumer feedback is critical.

Existing techniques for obtaining satisfactory feedback and formatting it for useful and meaningful review are extremely costly. That is because they typically require employing small armies of telemarketers, data entry clerks, interviewers, statisticians and/or other data collection teams, and still others to convert, format and make sense of the information collected.

Another problem with information gathering is the attention, concentration and understanding of the participants. For example, feedback received from survey participants may be unreliable, inaccurate or unhelpful if survey participants lose interest or become distracted while taking the survey. Survey participants soon become bored with survey questions, particularly when presented in large quantities, in printed form, or unclear or tedious language, and provide abrupt, confusing, careless and/or ill-considered feedback when required to respond.

Some methods of keeping participants interested involve extrinsic motivation, such as payment. Providing extrinsic motivation is often unsatisfactory, however, because the participant is still not genuinely interested in the survey. For that, intrinsic motivation is needed. It is known that human interviewers presenting live questions can sometimes create intrinsic motivation and can maintain a participant's focus and concentration for a longer period of time. The interaction itself provides the intrinsic motivational component needed. However, not only is it extremely expensive to pay and train live interviewers, but also live human interviewers themselves can become bored when asking the same questions over and over again and repetitively logging participants' answers. When this happens, live interviewers lose their effectiveness in holding the attention of participants.

Moreover, survey sponsors can rarely rely on the relevant consumers—even by enticing them with free gifts or cash payments—to travel to the survey sponsor or any other location to take a survey. Therefore, the work is typically done in focus groups, through door-to-door canvassing, through the use of paid diaries delivered by mail or through telephone surveys. Consumers simply require utmost convenience to themselves in providing survey information. Thus, survey sponsors must also overcome the problem of survey delivery—that is, ensuring that the questions are made available at a location sufficiently convenient to participants. Extensive and expensive planning involving demographics and geographical regions is typically conducted, leading afterward to the dispatching of teams to varied locations, often nationwide.

Still another problem with traditional survey techniques relates to the long delay between the gathering of information and the conversion of the information into a form useful to the survey sponsors. Traditional data collection, data entry and tabulating processes commonly require labor intensive and error fraught keyboarding of data from survey forms. Entities conducting surveys often have to wait for results to be returned by mail before they can even begin to be processed.

What is needed is a system for gathering information from consumers which will hold the consumers' interest and avoid distraction, which will minimize the time and expense of gathering the information and making it useful and which will maximize convenience to consumers.

SUMMARY OF THE INVENTION

One embodiment of the invention is a survey system, which comprises (1) a computer comprising (a) a computer readable medium; (b) a processor; and (c) a display; (2) a script comprising question data representing a question, the script stored in the computer readable medium; (3) character image data representing a character communicating information, the character image data stored in the computer readable medium; and (4) a user interface running on the processor, the user interface configured to access the script, the user interface configured to process the question data to communicate the question to a user, an image generator of the user interface configured to process the character image data to create a representation of the character on the display during the communication of the question, the user interface configured to receive and process response data representing a response provided by the user, the user interface configured to store in the computer readable medium answer data representing the response provided by the user. One aspect of the system further comprises (1) response pattern data representing a portion of a possible user response to the question; and (2) lobbying data representing lobbying information to persuade the user to respond to the question by providing a response that does not include the at least one portion of the response to the question, the user interface configured to compare the response data to the response pattern data to determine whether the response provided by the user includes the predetermined portion of a possible response and, if so, to process the lobbying data to communicate the lobbying information to the user without storing the answer data. That aspect may preferably further comprise expression data representing an expression of the character, the user interface configured to process the expression data to cause the image generator to process the character image data to change an expression of the representation of the character on the display during the communication of the lobbying information. In another aspect, the system further comprises (1) response pattern data representing a portion of a possible user response to the question; and (2) advertising data representing advertising information to inform the user about goods or services, the user interface configured to compare the response data to the response pattern data to determine whether the response provided by the user includes the predetermined portion of a possible response and, if so, to process the advertising data to communicate the advertising information to the user. In still another aspect, the system further comprises (1) response pattern data representing a portion of a possible user response to the question; and (2) entertainment data representing an offer of an incentive or reward to the user for answering the question, the user interface configured to compare the response data to the response pattern data to determine whether the response provided by the user includes the predetermined portion of a possible response and, if so, to process the entertainment data to communicate or present the offer to the user. In yet another aspect, the system further comprises (1) first response pattern data representing a portion of a first possible user response to the question; (2) second response pattern data representing a portion of a second possible user response to the question; and (3) predetermined answer data, the user interface configured to compare the response data to the first response pattern data and to compare the response data to the second response pattern data, and, if either comparison results in a match, to store the predetermined answer data in the computer readable medium without storing the answer data. That aspect may preferably further comprise (1) third response pattern data representing a portion of a third possible user response to the question; and (2) second predetermined answer data, the user interface configured to compare the response data to the third response pattern data and, if that comparison results in a match, to store the second predetermined answer data in the computer readable medium without storing the answer data. In a different aspect, the system further comprises expression data representing an expression of the character, the user interface configured to process the expression data to cause the image generator to process the character image data to change an expression of the representation of the character on the display during the communication of the question. That aspect may preferably further comprise remote character image data residing on a computer readable storage medium operably connected to a second computer, the second computer in network contact with the first computer, the user interface configured to request and receive the remote character image data to cause the image generator to process the remote character image data to change an expression of the representation of the character on the display during the communication of the question. In a different aspect, the system further comprises a voice output module creating audio output to communicate the question to the user. That aspect may preferably be one wherein the user interface is configured to communicate the question by displaying text characters during a time when the voice output module communicates the question by creating audio output. Still a different aspect of the system further comprises (1) response pattern data representing a portion of a possible user response to the question; (2) remote lobbying data representing lobbying information to persuade the user to respond to the question by providing a response that does not include the at least one portion of the response to the question, the remote lobbying data residing on a computer readable storage medium operably connected to a second computer, the second computer in network contact with the first computer; and (3) a voice output module, the user interface configured to compare the response data to the response pattern data to determine whether the response provided by the user includes the predetermined portion of a possible response and, if so, to request and receive the remote lobbying data and to route data to the voice output module to create audio output representing the lobbying information. Another aspect of the system further comprises a voice recognition module creating the response data from a spoken response provided by the user. An additional aspect of the system further comprises (1) an answer format value representing a predetermined format for answer data provided in response to the question; and (2) survey result instructions formatting the answer data in accordance with the answer format value to create a survey result report. That aspect may preferably further comprise survey collection instructions, the survey collection instructions associating the stored answer data with second answer data provided by a second user in response to the question, the survey result instructions formatting the second answer data to create the survey result report. That aspect may preferably be one wherein the survey result instructions and the survey collection instructions are executed by a processor of a second computer. That aspect may preferably further comprise a third computer connected by a network to the second computer, the second computer transmitting the survey result report to the third computer in response to a request for the survey result report. That aspect may preferably be one wherein the network is the internet, the survey result report is a web page, and an internet browsing application running on the third computer issues the request for the survey result report.

Another embodiment of the present invention is a survey system, which system comprises (1) question data representing a question; (2) response pattern data representing at least one portion of a response to the question; (3) lobbying data representing lobbying information to persuade a user to respond to the question by providing a response that does not include the at least one portion of the response to the question; and (4) a user interface configured to process the question data to communicate the question to a user, the user interface configured to receive and process response data representing a response provided by the user, the user interface configured to compare the response data to the response pattern data to determine whether the response provided by the user includes the at least one portion of the response to the question and, if so, to process the lobbying data to communicate the lobbying information to the user. One aspect of the system is one wherein the user interface is further configured to generate and store answer data representing the response provided by the user if the user interface determines that the response provided by the user does not include the at least one portion of the response to the question. That aspect may preferably be one wherein the user interface is configured to transmit character image data to a display during the communication of the question and the lobbying information, the character image data rendered to represent a character communicating the question and the lobbying information.

Still another embodiment of the present invention is a system for questioning a survey participant. The system comprises (1) a computer readable storage; (2) a display; (3) a survey script stored on the computer readable storage, the survey script comprising question data, expression data, and response processing instructions; and (4) a virtual human interface comprising an image generator, a script parser and a response parser, the script parser parsing the question data to present a question to a user, the image generator displaying on the display a representation of an animated character communicating information during the presenting of the question, the script parser parsing the expression data to cause the image generator to change the representation of the character, the script parser parsing the response processing instructions to identify at least one portion of one possible response by the user to the question and to associate predetermined responsive steps with the response, the response parser parsing input provided by the user to detect the portion of the one possible response and to perform the predetermined responsive steps, the predetermined responsive steps including storing in an answer file answer data representing the input provided by the user and storing in the answer file in association with the answer data a question identifier identifying the question. One aspect of the system is one wherein the image generator comprises software instructions stored on the computer readable storage, the script parser comprises software instructions stored on the computer readable storage, and the response parser comprises software instructions stored on the computer readable storage. That aspect may preferably further comprise (1) an answer format value representing a predetermined format for answer data provided in response to the question, the answer format value having a predetermined association with the question identifier; and (2) a survey report generator configured to parse the answer file for the question identifier and to retrieve the answer format value and to use the answer format value to format the answer data in a survey result report.

Yet another embodiment of the present invention is a method of conducting a survey. The method comprises the steps of (1) providing in a computer readable medium question data representing a question; (2) providing in the computer readable medium character image data representing a character communicating information; (3) communicating the question to a user by processing the question data; (4) displaying a representation of the character on a display during the communication of the question by processing the character image data; and (5) responding to a response to the question provided by a user by storing in the computer readable medium answer data representing the response. In one aspect, the method comprises the further steps of (1) providing in the computer readable medium response pattern data representing a portion of a possible user response to the question; (2) providing in the computer readable medium lobbying data representing lobbying information to persuade the user to respond to the question by providing a response that does not include the at least one portion of the response to the question; (3) comparing response data representing the response provided by the user to the response pattern data; and (4) communicating the lobbying information to the user by processing the lobbying data without storing the answer data if the response data includes the response pattern data. That aspect may preferably comprise the further steps of (1) providing in the computer readable medium expression data representing an expression of the character; and (2) processing the expression data to change an expression of the displayed character during the communication of the lobbying information. Another aspect may comprise the further steps of (1) providing in the computer readable medium response pattern data representing a portion of a possible user response to the question; (2) providing in the computer readable medium advertising data representing advertising information to inform the user about goods or services; (3) comparing response data representing the response provided by the user to the response pattern data; and (4) communicating the advertising information to the user by processing the advertising data if the response data includes the response pattern data. Still another aspect may preferably comprise the further steps of (1) providing in the computer readable medium response pattern data representing a portion of a possible user response to the question; (2) providing in the computer readable medium entertainment data representing an offer of an incentive or reward to the user for answering the question; (3) comparing response data representing the response provided by the user to the response pattern data; and (4) communicating or presenting the entertainment information to the user by processing the entertainment data if the response data includes the response pattern data. Yet another aspect may preferably comprise the further steps of (1) providing in the computer readable medium first response pattern data representing a portion of a first possible user response to the question; (2) providing in the computer readable medium second response pattern data representing a portion of a second possible user response to the question; (3) providing in the computer readable medium predetermined answer data; (4) comparing response data representing the response provided by the user to the first response pattern data; (5) comparing the response data representing the response provided by the user to the second response pattern data; and (6) storing in the computer readable medium the predetermined answer data without storing the answer data if either comparison results in a match. An additional aspect may preferably comprise the further steps of (1) providing in the computer readable medium expression data representing an expression of the character; (2) providing in the computer readable medium response pattern data representing a portion of a possible user response to the question, the response pattern data having a predetermined relationship with the expression data; (3) comparing response data representing the response provided by the user to the response pattern data; and (4) changing an expression of the displayed character by processing the expression data if the comparison results in a match. That aspect may preferably be one wherein the expression data resides on a remote computer readable medium and wherein the processing of the expression data includes requesting the expression data from the remote computer readable medium and transmitting the expression data from the remote computer readable medium. An aspect described above comprising advertising data may preferably be one wherein the advertising data resides on a remote computer readable medium and wherein the processing of the advertising data includes requesting the advertising data from the remote computer readable medium and transmitting the advertising data from the remote computer readable medium. An aspect described above comprising advertising data may preferably be one wherein the advertising data includes voice data and references to expression data, the method comprising the further steps of, and the aspect may preferably further comprise the steps of (1) providing in the computer readable medium expression data representing an expression of the character; (2) communicating the advertising data as voice output by processing the voice data; and (3) changing an expression of the displayed character by processing expression data referenced by the advertising data if the comparison results in a match.

Another embodiment of the present invention is a method for processing survey data. The method comprises the steps of (1) providing in a computer readable medium question data representing a question; (2) providing in the computer readable medium an answer format value representing a predetermined format for answer data provided in response to the question; (3) associating a question identifier with the question data; (4) associating the answer format value with the question identifier; (5) receiving an answer file in the computer readable medium, the answer file including answer data representing a response provided by a user to the question, and the answer file including the question identifier; (6) parsing the answer file for the question identifier; (7) identifying the answer format value using the association with the question identifier; and (8) formatting the answer data in accordance with the predetermined format for answer data. One aspect of the method is one wherein the steps described therein are represented by software instructions stored in a computer readable medium.

Still another embodiment of the present invention is a survey system, which comprises (1) means for representing a question in a computer readable medium; (2) means for representing in the computer readable medium a portion of a first possible user response to the question; (3) means for communicating the question to a user; (4) means for generating a representation of a character communicating the question during the communication of the question; (5) means for receiving from the user a representation of a response provided by the user to the question; (6) means for performing a first comparison, the first comparison comprising comparing the representation of the response to the representation of the portion of the first possible user response; and (7) means for storing an answer representing the response if the first comparison results in a match. In one aspect, the system further comprises (1) means for representing in the computer readable medium a portion of a second possible user response to the question; (2) means for representing in the computer readable medium lobbying information to persuade a user to respond to the question by providing a response that does not include the portion of the second possible user response to the question; (3) means for performing a second comparison, the second comparison comprising comparing the representation of the response to the representation of the portion of the second possible user response; and (4) means for communicating the lobbying information to the user without storing the answer data if the second comparison results in a match. In another aspect, the system further comprises means for changing an expression of the representation of the character during the communication of the question. In still another aspect, the system further comprises (1) means for representing advertising information in a computer readable medium, the advertising information informing a user about goods or services; and (2) means for communicating the advertising information to the user if the first comparison results in a match. In yet another aspect, the system further comprises (I) means for representing entertainment information in a computer readable medium, the entertainment information rewarding or offering to reward the user for providing a response to the question; and (2) means for communicating or presenting the entertainment information to the user if the first comparison results in a match.

An additional embodiment of the present invention is a survey system, which comprises (1) a network; (2) a server coupled to the network, the server comprising a server processor and a server computer readable storage; (3) a first client coupled to the network, the first client comprising a first processor, a first computer readable storage, and a first display; (4) a script file stored on the server computer readable storage, the script file containing survey question data, the server computer configured to respond to a request for the script file from the first client by transmitting the script file to the first client; and (5) a virtual human interface stored on the first computer readable storage, the virtual human interface configured to display a representation of a human face on the first display, the virtual human interface configured to parse the script file and present the survey question data to a user, the virtual human interface configured to change the representation of the human face during the presentation of the survey question data, and the virtual human interface configured to record a response of the user in an answer file, the virtual human interface configured to transmit the answer file to the server computer, the server computer configured to process the answer file and at least one additional answer file to generate a report including formatted answer data.

BRIEF DESCRIPTION OF THE DRAWINGS

FIG. 4 illustrates one embodiment of a survey results report generated by a survey results server.

DETAILED DESCRIPTION OF THE PREFERRED EMBODIMENTS

Figure 1:
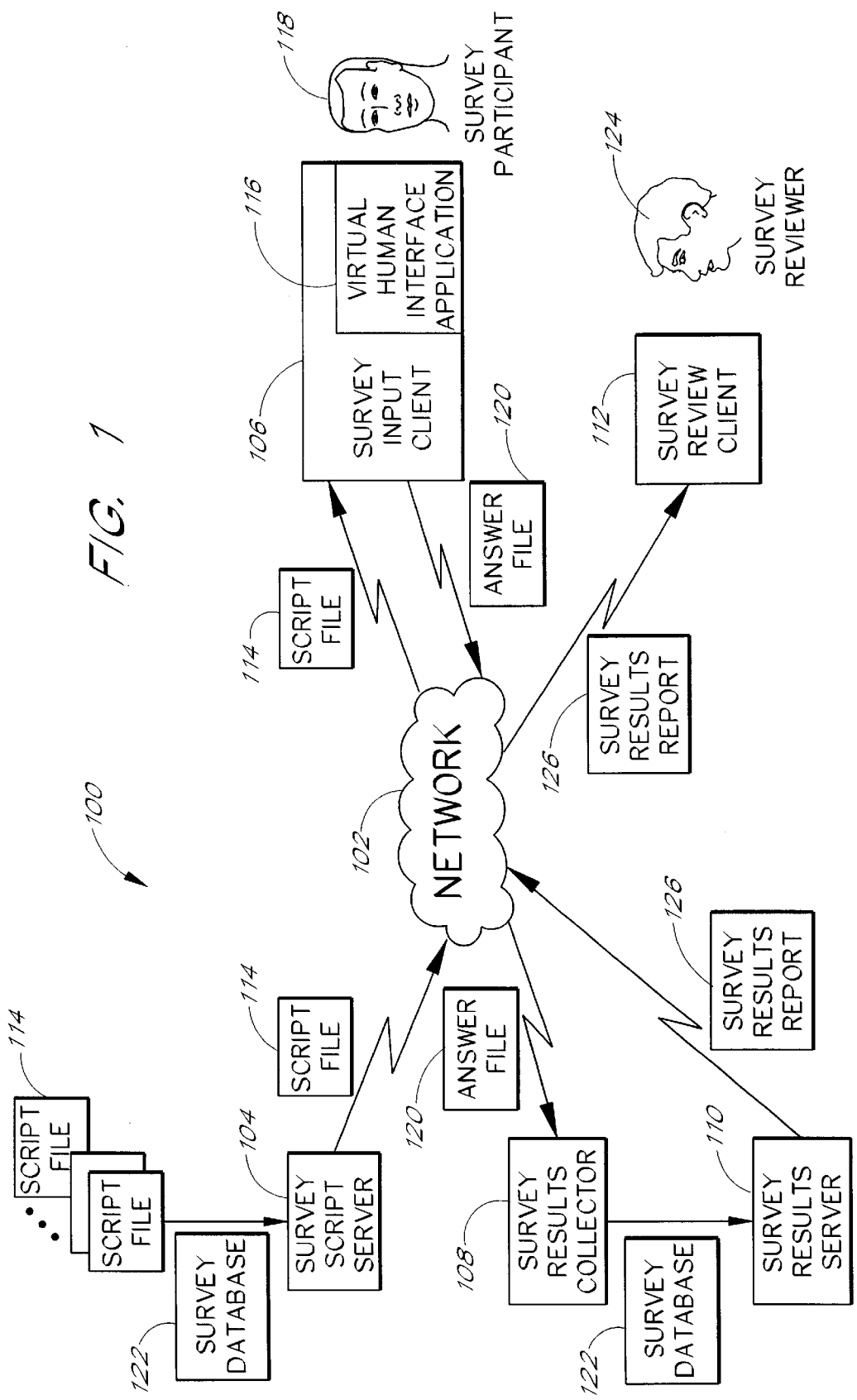
FIG. 1 is a block diagram of one embodiment of a survey system in accordance with the present invention.

FIG. 1 is a block diagram illustrating one embodiment of a survey system 100 in accordance with the present invention. In that embodiment, the survey system 100 includes a network 102 in communication with a survey script server 104, a survey input client 106 having a virtual human interface application 116, a survey results collector 108, a survey results server 10, and a survey review client 112. The network 102 may be any type of computer network, public or private, LAN and/or WAN, wire-based and/or wireless, and may use one or a combination of network protocols such as Ethernet or token ring. In the preferred embodiment, however, the network 102 is the Internet.

The survey script server 104 maintains a plurality of script files 114. The script files 114 provide scripting for the virtual human interface application 116 of the survey input client 106. More particularly, the script files 114 include question data, which form the basis of questions ultimately posed to survey participants 118. Preferably, the script files 114 stored in the survey script server 104 are updated periodically.

Overview of System Operation

Generally, a virtual human interface is a bridge between humans and technology built from artificial intelligence and natural language components. Because it recognizes and understands human communication on one side and technology communication on the other, the virtual human interface can translate meaning between the two. In the survey context, the virtual human interface can ask questions in human terms, receive responses provided in human terms, translate the responses into machine terms, perform machine-based processing on the machine terms, and then translate the machine-processed information back into human terms for communication to a human.

In operation, the virtual human interface application 116 of the survey input client 106 interacts with a survey participant 118 through a virtual human user interface including a Verbot™. Upon initial activation, the Verbot™ requests permission from the survey participant 118 to periodically download script files 114 from the survey script server 104. If the survey participant 118 grants permission, then the virtual human interface application 116 directs the survey input client 106 to periodically request script files 114 from the survey script server 104 automatically and engage the survey participant 118 in a conversation including embedded survey question content. If the survey participant 118 does not grant permission, then the Verbot™ periodically seeks permission to download a script file 114, and the survey input client 106 is directed to request a script file 114 from the survey script server 104 only when the survey participant 118 authorizes the request.

In either of the situations described above, the virtual human interface application 116 occasionally directs the survey input client 106 to send a request for a script file 114 to the survey script server 104 over the network 102. When the survey script server 104 receives such a request, it sends a script file 114 to the survey input client 106 over the network 102.

In some embodiments, the survey script server 104 can optionally maintain demographic, geographic or other information regarding users, including the ability to identify users who do not participate in surveys regularly. Nevertheless, individual survey participants 118 will preferably remain anonymous, being only identified by their sample selection criteria status.

After downloading the requested script file 114, the Verbot™ engages the survey participant 118 in a conversation including embedded survey questions as scripted in the most recently acquired script file 114. During the survey, the survey participant 118 responds to the scripted survey questions asked by the Verbot™. The Verbot™ stores the responses of the survey participant 118 in an answer file 120 on the survey input client 106.

Simultaneously, the Verbot™ can respond to the survey participant 118 verbally with encouragement, motivating comments, and the like. In some embodiments, the Verbot™ can offer to play a game with the survey participant 118 or give the survey participant 118 some other reward, such as coveted information.

Upon completion of the survey, the virtual human interface application 116 directs the survey input client 106 to send the answer file 120 generated during the survey to the survey results collector 108 over the network 102. The survey results collector 108 receives the answer file 120 from the survey input client 106 and extracts survey result data from the answer file 120. The survey results collector 108 then adds the survey result data to a survey database 122. The survey database 122 includes survey result data obtained from many different survey participants 118, which may number in the hundreds, thousands or millions. Because the survey results collector 108 may be receiving answer files 120 frequently, it may frequently update the survey database 122.

The survey review client 112 allows a survey reviewer 124 to review the results of any survey for which the survey reviewer 124 is authorized. In some embodiments, a particular survey results server 110 may be compiling results for several unrelated survey sponsors at the same time. Because survey results data can be very time-sensitive and valuable, each category of results data is preferably protected from unauthorized viewing.

When an authorized survey reviewer 124 wishes to review the results of a survey, the survey reviewer 124 uses the survey review client 112 to access the network 102. In a preferred embodiment, the survey review client 112 accesses a website hosted by the survey results server 110. Preferably, the survey reviewer 124 uses a standard web browser to access the survey results server 110. Thus, the survey reviewer 124 can access the survey results data from anywhere in the world, even using an Internet-enabled wireless palm-top computer or cellular telephone.

In one embodiment, the survey results server 110 generates and transmits to the survey reviewer 124 a web page having a hyperlink associated with each sponsor in the survey database 122. The survey reviewer 124 selects a sponsor by clicking on a sponsor hyperlink, and the survey results server 110 generates another web page having USER and PASSWORD fields and an ENTER button. The survey reviewer 124 fills in the fields and clicks the ENTER button. The survey results server 110 authenticates the survey reviewer 124 by querying the PASSWORD_TABLE. In an alternative embodiment, the authentication can be performed through the use of browser cookies. After authenticating the survey reviewer 124, the survey results server 110 generates and transmits a web page, which presents a list of survey hyperlinks (each labeled by survey name), one for each survey in the survey database 122 for the selected sponsor. When the survey reviewer 124 selects a survey hyperlink, the survey results server 110 generates and transmits a survey result report 126 web page, which presents the results of the selected survey.

Because the survey results server 110 generates web pages dynamically from the survey database 122, the survey results report 126 advantageously reflects up-to-the-minute survey results data. Moreover, the survey reviewer 124 may advantageously receive virtually instant updates by selecting the "Refresh Page" option on the browser of the survey review client 112.

Survey Database

In one embodiment, the survey database 122 organizes data in a hierarchical fashion. While many different organizations may be implemented to store and access survey-related data, one embodiment uses the following database tables:

| NAME OF TABLE | DESCRIPTION |
| --- | --- |
| SPONSOR_TABLE | The SPONSOR_TABLE includes entries (or records) which hold information about each of potentially many survey sponsors. Each record includes a unique SPONSOR_ID field assigned to a particular sponsor. Each record also includes additional information (additional database fields) relating to the survey sponsor such as, for example, name, contact name, address, phone number, fax number, e-mail, web site, billing information, number of surveys conducted, number of surveys pending, etc. Those of ordinary skill will appreciate that each field is of the appropriate type |

| NAME OF TABLE | DESCRIPTION |
|---|---|
| | (e.g., string, integer, etc.) and is an appropriate length (e.g., 512 characters, 4 bytes, etc.). |
| PASSWORD_TABLE | The PASSWORD_TABLE holds user and password data which facilitate secure access to survey information. Each record in the PASSWORD_TABLE includes a SPONSOR_ID field, which provides a cross-reference to a sponsor in the SPONSOR_TABLE. Each record also includes a USER field and a PASSWORD field. Thus, for any given SPONSOR_ID, the PASSWORD_TABLE may be queried to determine all valid user/password combinations, which can, in turn, be used to validate an entered user name and password combination. The PASSWORD_TABLE allows a single survey sponsor to have multiple user/password combinations with which to access, for example, survey result data, or other information in the survey database. |
| SURVEY_TABLE | The SURVEY_TABLE includes entries (or records) which keep track of information about each survey. Each record includes a unique SURVEY_ID field assigned to a particular survey. Each record (and thus each survey) is cross-referenced to one or more survey sponsors by a SPONSOR_ID which matches the same-named field in the SPONSOR_TABLE. Thus, by querying the SURVEY_TABLE using a SPONSOR_ID value, all surveys for any sponsor may be easily located. Each record in the SURVEY_TABLE also includes additional information (additional fields) about each survey such as, for example, name/title of survey, description of subject matter, number of questions, date created, geographic concentration, path to retrieve corresponding script file(s), full text of script file, URL for related survey results web page, number of responding participants, number of refusing participants, etc. |
| QUESTION_TABLE | The QUESTION_TABLE includes entries (records) for each question in any survey. Each record thus includes a unique QUESTION_ID field which uniquely references a particular question. Each record is cross-referenced to one or more surveys by including a SURVEY_ID field which matches the SURVEY_ID field in the SURVEY_TABLE. Thus, by querying the QUESTION_TABLE using a SURVEY_ID value, all questions in the survey may be easily located. Each record in the QUESTION_TABLE also includes an ANSWER_FORMAT field which holds a value indicating how answers for the question should be processed for presentation to a survey reviewer (e.g., "top5and%" indicates that the five responses most frequently given should be listed along with the percentage of users providing the respective response; "listall" indicates that all answers provided be listed sequentially). Each record in the QUESTION_TABLE includes additional information (fields) about each question such as, for example, sequential question number, text of question, etc. |
| ANSWER_TABLE | The ANSWER_TABLE includes entries (records) for each answer recorded for any question in a survey. Each record in the ANSWER_TABLE includes a SURVEY_ID field identifying the particular survey for which the answer was provided. |

| NAME OF TABLE | DESCRIPTION |
|---|---|
| | Each record also includes a QUESTION_ID field which matches the QUESTION_ID field in the QUESTION_TABLE. Thus, by using a QUESTION_ID value, the ANSWER_TABLE may be easily queried to locate each separate answer provided for a particular question. Also, each record in the ANSWER_TABLE includes a PARTICIPANT_ID field which matches the PARTICIPANT_ID field in the PARTICIPANT_TABLE. Using the PARTICIPANT_ID value to query the ANSWER_TABLE, all answers provided by a particular survey participant may be easily located. Each record of the ANSWER_TABLE includes addition information (fields) about each answer, including the answer data, whether text, numeric or otherwise, provided by the participant, the date the answer was recorded, etc. |
| ANSWER_FORMAT_TABLE | The ANSWER_FORMAT_TABLE includes records which correspond to a type of format to apply to a group of answers to present the results. An ANSWER_FORMAT field provides the name of an available answer format, and an ANSWER_FORMAT_DESCRIPTION field provides a description of the formatting associated with an answer format. For example, one record may have "top5and%" assigned to the ANSWER_FORMAT field, and, in the ANSWER_FORMAT_DESCRIPTION field, the record may have the text "choose the five responses most frequently given and show the percentage of users providing the respective response." This table may be used, for example, in a survey design module to retrieve descriptions of all available answer formats, display them to a survey designer, allow a survey designer to choose one, and then provide the corresponding answer format name. |
| PARTICIPANT_TABLE | The PARTICIPANT_TABLE includes entries for each survey participant who has provided answer data for any survey. Each record of the PARTICIPANT_TABLE includes a PARTICIPANT_ID field uniquely identifying a particular participant. Each record of the PARTICIPANT_TABLE includes additional information for each participant such as, for example, geographic location, computer configuration, time to complete survey, average time to complete survey, number of surveys completed, etc. |

In one embodiment of the invention, a survey administrator populates the survey database 122 with information about each survey sponsor that is conducting surveys. A survey database management application permits the survey administrator to interact with the survey database 122 to, for example, browse the existing records in any of the tables, enter new data and create new records in any of the tables, modify data in any existing record in any table, and also delete any record data in any of the tables. Such database management applications are common and supported by existing database applications such as, for example, Microsoft Access, Oracle, Sybase and FoxBase. Those and other database applications provide extensive database management application design tools, simplifying the design of database management applications, and those of ordinary skill understand well how to use the design tools to construct and operate such database management applications. Thus, the present invention is not limited by a particular survey database management application.

As is well known in the field of database management applications, the survey database management application permits a survey administrator to select a database table (i.e., SPONSOR_TABLE, PASSWORD_TABLE, SURVEY_TABLE, etc.) for operations and to select the type of operation (e.g., browse records, create new record, modify records, delete records). While the browse, modify and delete functions may retrieve all records in the selected table and allow the administrator to scroll through all of them, possibly to choose one for modification or deletion, the survey database management application also supports query operations. By providing data for one or more fields and issuing a query command, the survey administrator can retrieve a subset of records (or recordset) in the selected table for browsing, modification or deletion.

Thus, to enter information for a new survey sponsor using the survey database management application, the survey administrator selects the SPONSOR_TABLE for operations and chooses a create record option. The survey database management application is designed to then query the SPONSOR_TABLE for all records, determine the highest existing value for SPONSOR_ID in any of the fields, increment that value by one and automatically assign it to the SPONSOR_ID field for the new record to be created. Such technique for selecting unique identification values is well known in the art. Next, the survey database management application prompts the survey administrator to fill in text fields on a computer screen, which fields correspond to fields comprising a SPONSOR_TABLE record. The survey administrator enters information about a sponsor such as, for example, the name of the sponsor (e.g., "XYZ Productions, Inc."), contact name, address, phone number, fax number, etc. When the fields are filled in, the survey administrator invokes a CREATE RECORD command, causing a new record to be created for the SPONSOR_TABLE.

Those of ordinary skill will appreciate that, using the same process, the survey administrator can create new records for any of the tables in the survey database. Accordingly, the survey administrator may select the PASSWORD_TABLE and the create record option to enter password data for a sponsor. The survey database management application is further designed to provide pull-down menus for fields in a record which are cross-reference fields, that is, fields that are designed to represent a relationship with one or more data records in another table. Such functionality, is, again, well known in the art, and the present invention is not limited by any design for pull-down menus reflecting cross-reference field values. Thus, because the SPONSOR_ID field of each PASSWORD_TABLE record is to be cross-referenced with a SPONSOR_ID value in one of the SPONSOR_TABLE records, the survey database management application presents a pull-down menu next to a field corresponding to the SPONSOR_ID field for the password record. When the administrator activates the pull-down menu, it presents a list of the names of each of the sponsors, those names having been extracted from the SPONSOR_TABLE records. When the administrator selects one of the names, the survey database management application enters the corresponding SPONSOR_ID in the SPONSOR_ID field of the new password record. The administrator then enters a user name and a password in fields corresponding to the USER and PASSWORD fields and invokes a CREATE RECORD command to cause the new record to be added to the PASSWORD_TABLE.

Those of ordinary skill in the art will appreciate that, with sponsor information and password information entered into the survey database, a limited survey database management application can be provided to sponsors to allow limited access to the survey database. It will be understood that the limited survey database management application can use the PASSWORD_TABLE to authenticate any sponsor before providing limited access to the survey database. With limited access, a sponsor may advantageously directly provide information about particular surveys and questions, and, also advantageously, may even change password data or add new user and password data for additional persons. As will further be appreciated, the limited survey database management application can restrict access to only the data that corresponds to the sponsor's SPONSOR_ID (which, in one embodiment, the sponsor cannot change) or data cross-referenced thereto. Thus, many sponsors can access the survey database with no capability to view or alter data except that associated with the respective sponsor.

Server and Client Configuration

Figure 2:
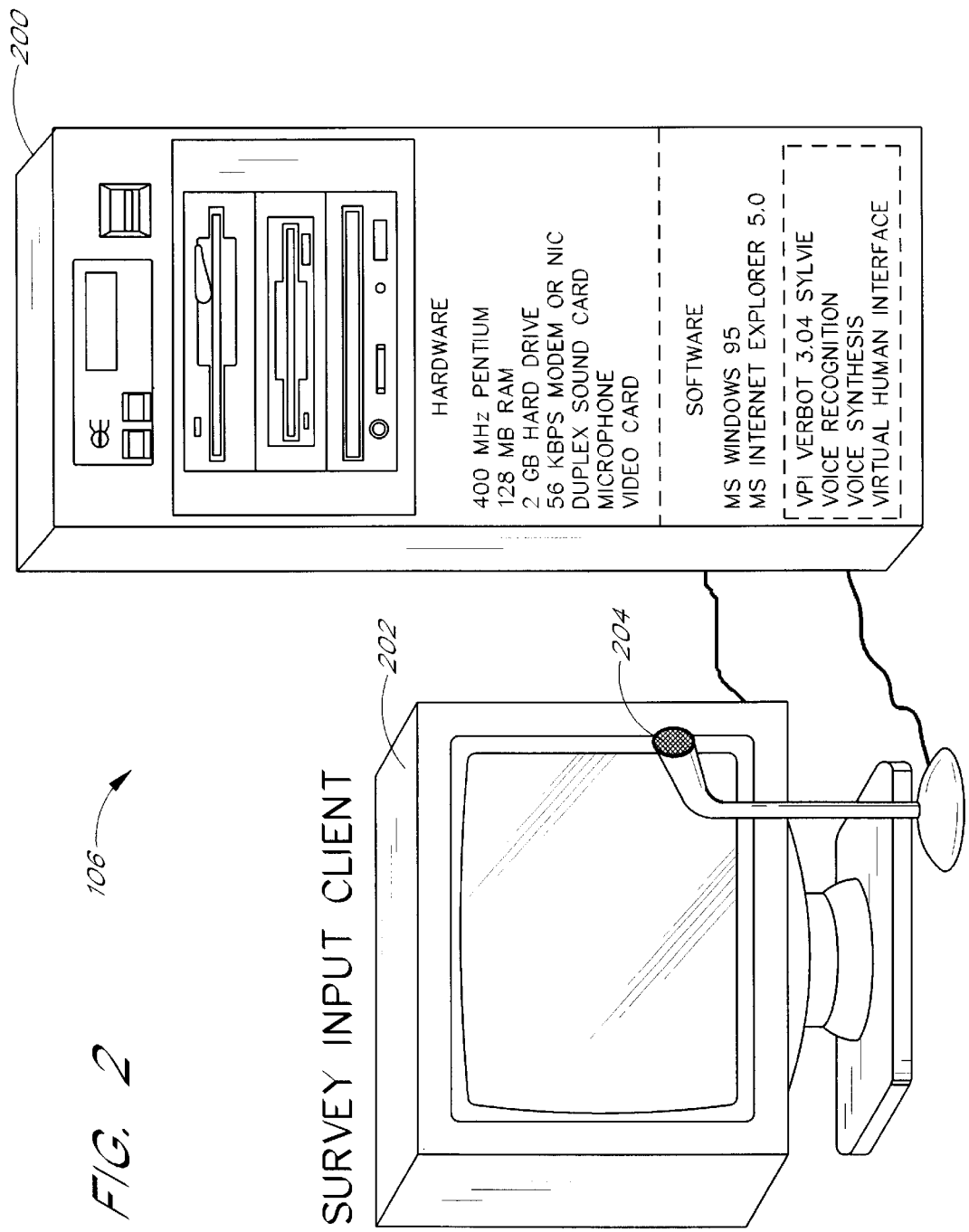
FIG. 2 illustrates one embodiment of a survey input client in accordance with the present invention.

FIG. 2 illustrates one embodiment of a survey input client 106 in accordance with the present invention. In the illustrated embodiment, the survey input client 106 comprises a personal computer 200, a monitor 202, and a microphone 204 in addition to a mouse, keyboard and standard I/O ports (not shown). The personal computer 200 also includes a 400 megahertz (MHz) processor, 128 megabytes (MB) of random access memory, a 2 gigabyte (GB) hard drive, a 56 kilobits-per-second (kbps) modem or NIC (network interface card), a duplex sound card, and a video card. The invention, however, does not require all of these components. It will be appreciated by one of ordinary skill in the art that the personal computer 200 of the survey input client 106 can be any of a number of general purpose computers—whether desktop, laptop or palm-top—using one or more microprocessors, such as a Pentium, Pentium II, or Pentium III processor, or a K6 or Athlon processor, a MIPS processor, a Power PC processor or an ALPHA processor. The personal computer 200 of the survey input client 106 can also be a cellular device for internet access. As will be appreciated, the present invention is not limited by any type of processor—and may be used with a processor running at less than 400 MHz—and is also not limited by any particular hard disk drive, memory, sound card or video card.

The personal computer 200 of the illustrated embodiment also includes operating system and application software, such as Microsoft Windows 95, Microsoft Internet Explorer 5.0, voice recognition software, voice synthesis software, a Verbot™ application, such as, for example, Sylvie™ version 3.04 available from Virtual Personalities, Inc., and a virtual human interface application 116. It will be appreciated by those of ordinary skill in the art that the present invention could use other operating system software, such as UNIX, LINUX, OS/2, BE, System 7, Solaris, Mac OS or others. Likewise, the present invention is not limited by particular Internet communication software and, thus, common alternatives, such as Netscape Communicator, Mosaic, Opera, or any of a number of small screen cellular browsers, may be used.

In one embodiment, the invention comprises a framework of interfaced software modules, which may retrieve, process, create, format and transmit certain data. In a preferred embodiment, aspects of the invention are controlled and facilitated by the virtual human interface application module that directs certain processes to be carried out by other modules, including a Verbot™ application module (such as, for example, Sylvie™ version 3.04) and voice recognition and voice output modules. These modules, in turn, interact with other software modules, such as services provided by the operating system or such as Internet connection, communication and transmission functions provided by an Internet browser module. Thus, in the preferred embodiment, the modules are generally comprised of software instructions executable by a microprocessor.

As used herein, the word "module" refers not only to logic coded as a collection of software instructions, but also refers to logic embodied in hardware or firmware. In the software context, a module may have entry and exit points and may be coded in a high level language such as C, C++, Java, or Pascal, or may be coded in machine or assembler language. Software modules may be compiled and linked into an executable program or installed in a Dynamic Link Library (DLL). Software modules may also be coded in an interpretive language, such as BASIC. Software modules may be callable from other modules, may be nested within other modules, and/or may be invoked in response to a detected event or interrupt. Instructions of software modules may be coded into firmware, such as an EPROM. In the hardware context, modules may be comprised of connected logic units, such as gates and flip-flops, and/or may be comprised of programmable units, such as programmable gate arrays.

A computer configured similarly to the personal computer 200 can be used to carry out the processes of the survey review client 112. Generally and advantageously, any general-purpose computer configured to browse the Internet may be used as the survey review client 112.

Figure 3:
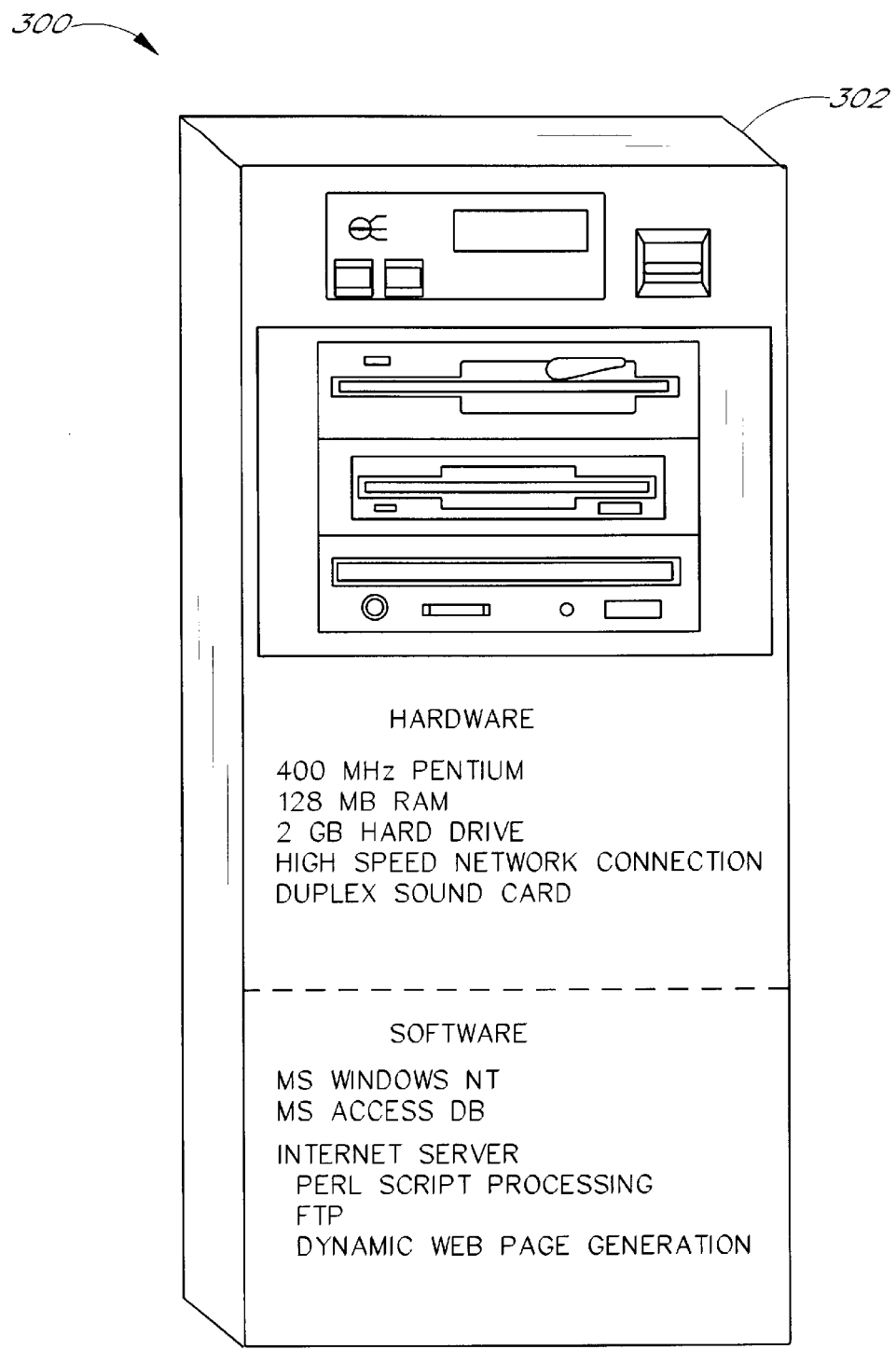
FIG. 3 illustrates one embodiment of a survey server in accordance with the present invention.

FIG. 3 illustrates one embodiment of a survey server 300 in accordance with the present invention. The survey server 300 preferably comprises a personal computer 302 including a 400 MHz processor, a 128 MB random access memory, a 2 GB hard drive, and a high speed network connection. As will be appreciated by those of ordinary skill in the art, the personal computer 302 can run multiple application software programs simultaneously. Thus, in a preferred embodiment, the personal computer 302 hosts the processes for the survey script server 104, the survey results collector 108, and the survey results server 110. Alternatively, separate computers could host the processes of the survey script server 104, the survey results collector 108, and the survey results server 110.

The personal computer 302 runs operating system software, for example, Microsoft Windows NT, which, as those of ordinary skill in the art understand, is multi-tasking, multi-threading, and preemptive. The personal computer 302 is not, however, limited by any of the services of Microsoft Windows NT, and can use any of the other operating systems mentioned above.

The personal computer 302 also runs application program software. In particular, database functions are provided by Microsoft Access database software, and Internet server functions are provided by Microsoft Internet Information Server. Other database software, such as, for example, Oracle, Sybase or FoxBase, capable of storing data based on relationships between data items and capable of performing queries to identify and retrieve the data may be used. Likewise, other internet server software, such as, for example, Apache, could be used to facilitate network-based communication with potentially large numbers of users, to serve HTML-compliant pages upon request, to process scripts, such as, for example, PERL scripts referenced in HTML page files using server side includes (SSI's), and to transfer data and files using other Internet protocols, such as FTP. Thus, the present invention is not limited by any database or Internet server application software.

In an on-line embodiment, the personal computer 302 includes a virtual human interface application 116, and a Verbot™ application, such as the on-line Sapphire™ class Verbot™ available from Virtual Personalities, Inc. In this embodiment, the Verbot™ can be embedded into the survey sponsor's server environment, such as an Internet server, and accessed by the survey participant 118 using any suitable network access application, such as a web browser. As described in more detail below, Java applets processing user input and script files and also controlling the transmission of voice and animation media may be used to implement the on-line Sapphire™ class Verbot™.

The operation of the virtual human interface application 116 in the on-line embodiment is similar to the operation of the virtual human interface application 116 in the embodiment described above, except that some of the human interface processing is handled by the survey server 300 rather than locally on the survey input client 106. This embodiment advantageously eliminates the need for a Verbot™ application and a virtual human interface application 116 on the survey input client 106. In this embodiment, browser cookies maybe used to track information regarding survey participants 118. It will be appreciated by those of ordinary skill that cookies are routinely used to allow web servers to recognize information about clients who repeatedly browse the server. Also, survey participants 118 can more easily participate in surveys from mobile and remote environments.

FIG. 4 illustrates a representation of one embodiment of a survey results report 126 generated by a survey results server 110. The survey results report 126 displays current survey result data in a form that is easy to analyze. For example, in the illustrated embodiment, the survey results report 126 displays statistical information regarding how the survey participants 118 rated the subjects of the survey on a given scale. It will be appreciated that countless other formats for survey result data may be used with the present invention, and the present invention is not limited by any particular format for result data.

Figure 5:
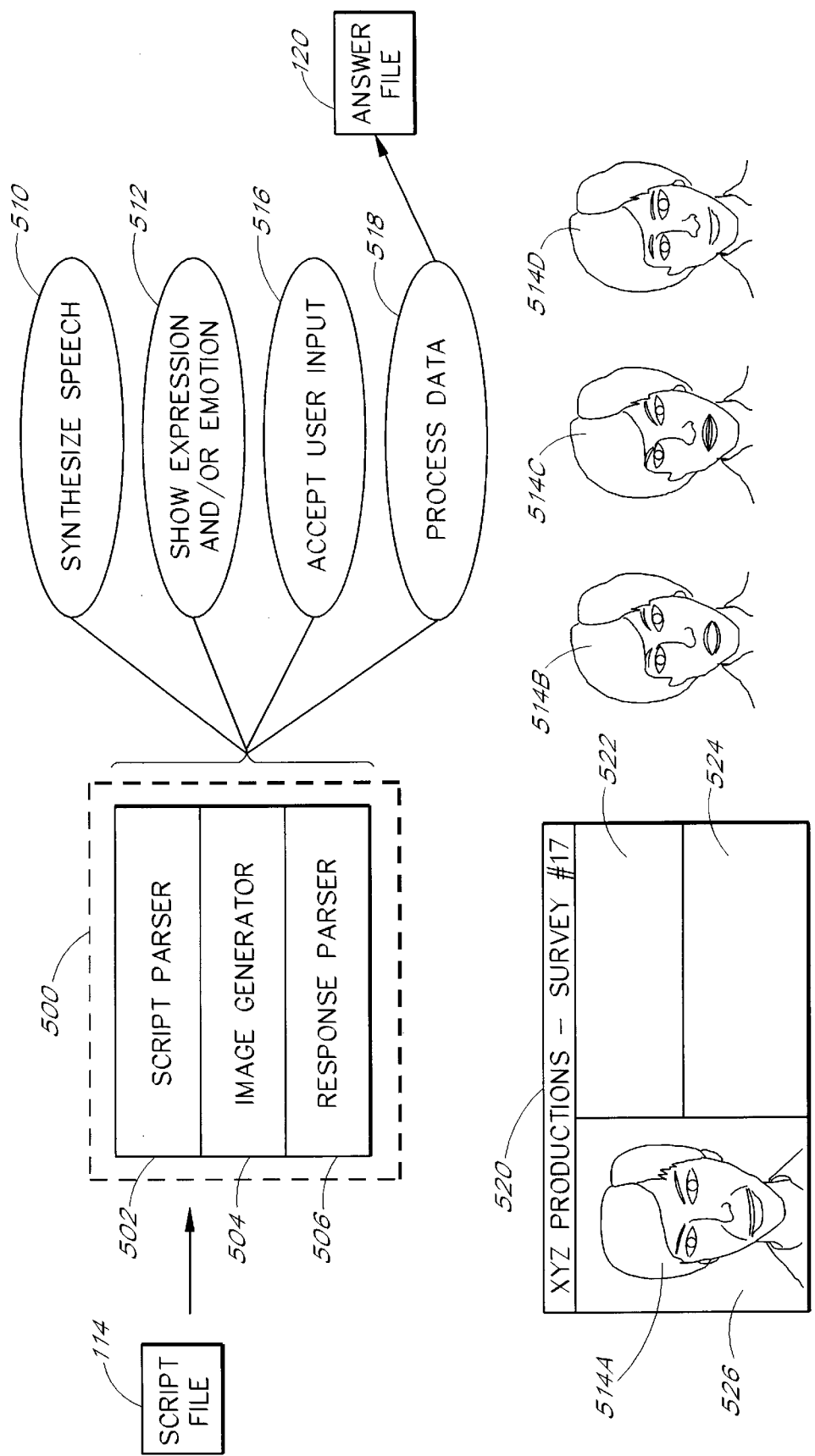
FIG. 5 illustrates a representation of aspects of a virtual human interface application in accordance with one embodiment of the present invention.
Figure 5A:
FIGS. 5A–5D illustrate representations of images of a character communicating information with expression and emotion in one embodiment of the invention.
Figure 5B:
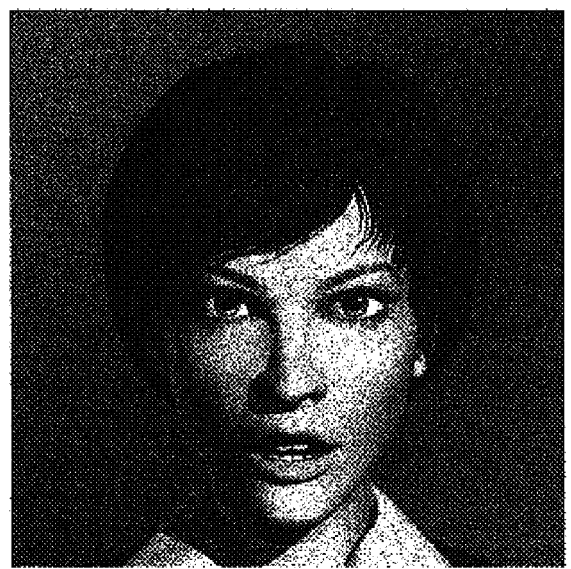
Figure 5C:
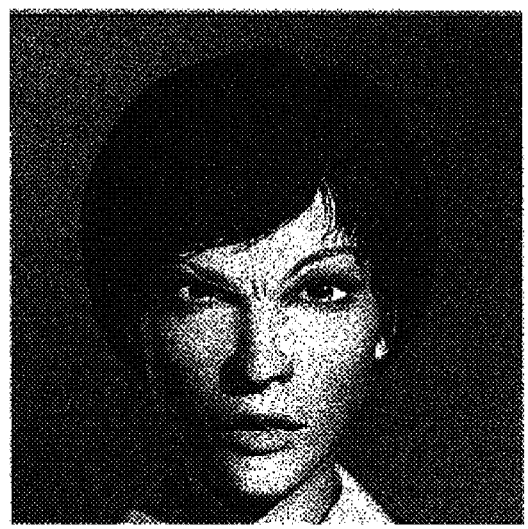
Figure 5D:
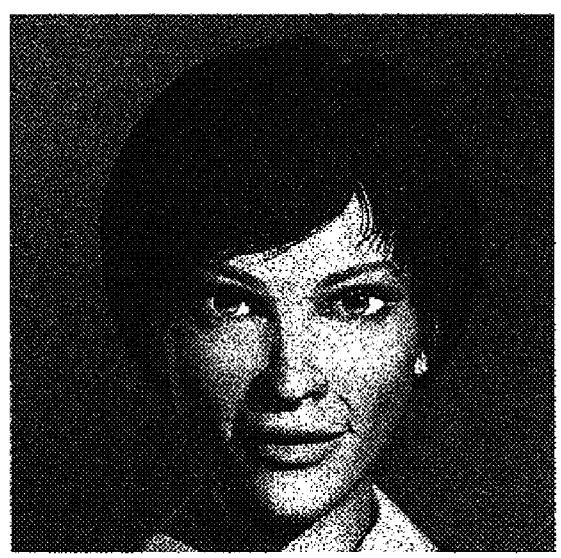

FIG. 5 illustrates a representation of aspects of a virtual human interface application 116 in accordance with one embodiment of the present invention. In this embodiment, the virtual human interface application 116 includes a Verbot™ 500. In one preferred embodiment, the Verbot™ 500 is Sylvie version 3.04 available from Virtual Personalities, Inc., which Verbot can be run locally on the survey client 200 The local embodiment of the Verbot 500 advantageously facilitates geographic control over surveys through simple distribution of the Verbot 500. In another preferred embodiment, the Verbot™ 500 is an on-line Sapphire class Verbot™ available from Virtual Personalities, Inc. The on-line embodiment of the Verbot 500 advantageously simplifies distribution of the Verbot 500 as it is available, in one embodiment, by simply accessing a web page.

Those of ordinary skill in the art will understand that the Verbot™ 500 includes particular modules, namely a script file parser 502, an image generator 504, and a response parser 506. It will also be appreciated that the Verbot™ 500 may carry out or facilitate certain user interface functions such as, for example, synthesizing speech 510 from text data, such as survey question data embedded in a script file 114 (also referred to as a net file), presenting photo-realistic images 512 comprising an animated human face in accordance with facial expression codes embedded in the script file 114, and recognizing all or portions of user input 516 to match one or more anticipated responses coded in a script file 114.

The on-line embodiment of the Verbot™ 500 performs similar functions. The response parser 506 is implemented as a JAVA applet, and image generation 504 is performed with the use of available web browser plug-ins, now in common use, which deliver animated content to Internet users. In a preferred embodiment, the on-line Verbot 500 uses Flash 4 from Macromedia, but could use Microsoft Agent or Pulse3D. It will be appreciated that the present invention may make use of those technologies as well as other rapidly developing media technologies (including image generation technology handling not only geometry, but also textures) that will permit the presentation of ever more realistic characters in connection with the virtual human interface.

The JAVA applet, in one embodiment of the present invention, operates in a web browser environment, receives and parses user responses, and, as necessary, sends requests from the user's web browser to the survey server 300 requesting, for example, specific voice and/or animation data. The survey server 300 responsively transmits a data stream comprising, for example, voice data and graphic frames representing a character communicating information, such as, for example, the movement of lips (lip-synch frames) to simulate a talking human. In one embodiment, the frames may be cached locally on the user's web browser to facilitate a faster response, and, in a further embodiment, the transmitted data stream may include voice data and references to cached frames. In another embodiment where transmission bandwidth is adequate, frames may be transmitted from the server on demand. As will be appreciated by those of ordinary skill, in one embodiment, the JAVA applet runs under JAVA version 1.1, and communicates with Flash 4 via the LiveConnect plug-in extension available from Netscape. Thus, in a preferred embodiment, the on-line version of the Verbot™ 500 resides partially on the survey server 300 and partially on the survey client 200 and interacts with a survey participant 118 through a web page.

In a preferred embodiment, the Verbot™ 500 is interfaced with voice recognition and voice output modules, such as, for example, those available from Lernout & Hauspie. However, the invention could use other voice recognition and voice output modules and is not limited by any particular voice recognition or voice output module. In this embodiment, the Verbot™ 500 can verbally present questions to a survey participant 118 and can accept and respond to the spoken responses of the survey participant 118. Those of ordinary skill in the art will understand that the script file parser 502 extracts question text from the script file 114 and presents the question text data as input to the voice output module, which generates sound through a sound card and/or speaker to verbalize the question text. It will be further appreciated that the voice output module can output a recorded human voice or a computer-synthesized voice that can be modified, such as in pitch and speed (e.g., to sound more like a man or a woman). Preferably, the voice output module of the on-line version of the Verbot™ 500 outputs a realistic human voice when interacting with the survey participant 118.

Like voice output modules, voice recognition modules are now widely available, and thus it will be understood that an application program can be provided with textual input that has been generated by a voice recognition module. Generally, a voice recognition module accepts analog voice input through a microphone, converts the analog signals to digital signals, samples and encodes the signals (such as, for example, by using pulse code modulation) and to convert the voice input to a data stream representing text characters. Often, existing voice recognition modules generate text characters corresponding to the spoken words with an accuracy of better than 90%. The present invention is not, however, limited by voice input or output.

In another embodiment, the Verbot™ 500 interacts with a survey participant 118, particularly the hearing impaired, by generating text in a user interface window 520 such as those commonly supported by the Microsoft Windows operating system. In this embodiment, the Verbot™ 500 generates text characters in a question text box 522. The question text characters are based on the question data parsed from a script file 114 or on response text scripted in the script file 114 to be presented to a survey participant 118 based on his or her input to the Verbot 500. The survey participant 118 reads the question text and responds by entering text via a keyboard into an answer text box 524. Upon striking the 'enter' key, the response parser 506 begins processing the entered text characters.

Both the local and the on-line embodiments of the Verbot™ 500 function in the same manner with respect to the text and voice inputs and outputs described above. For example, in both embodiments, the user has the option to engage both the text and voice outputs of the Verbot™ 500 at the same time. In one embodiment, preferably for use at bandwidths below 28.8 kbps, the user can advantageously select a text-only version of the on-line embodiment of the Verbot™ 500.

Figure 5E:
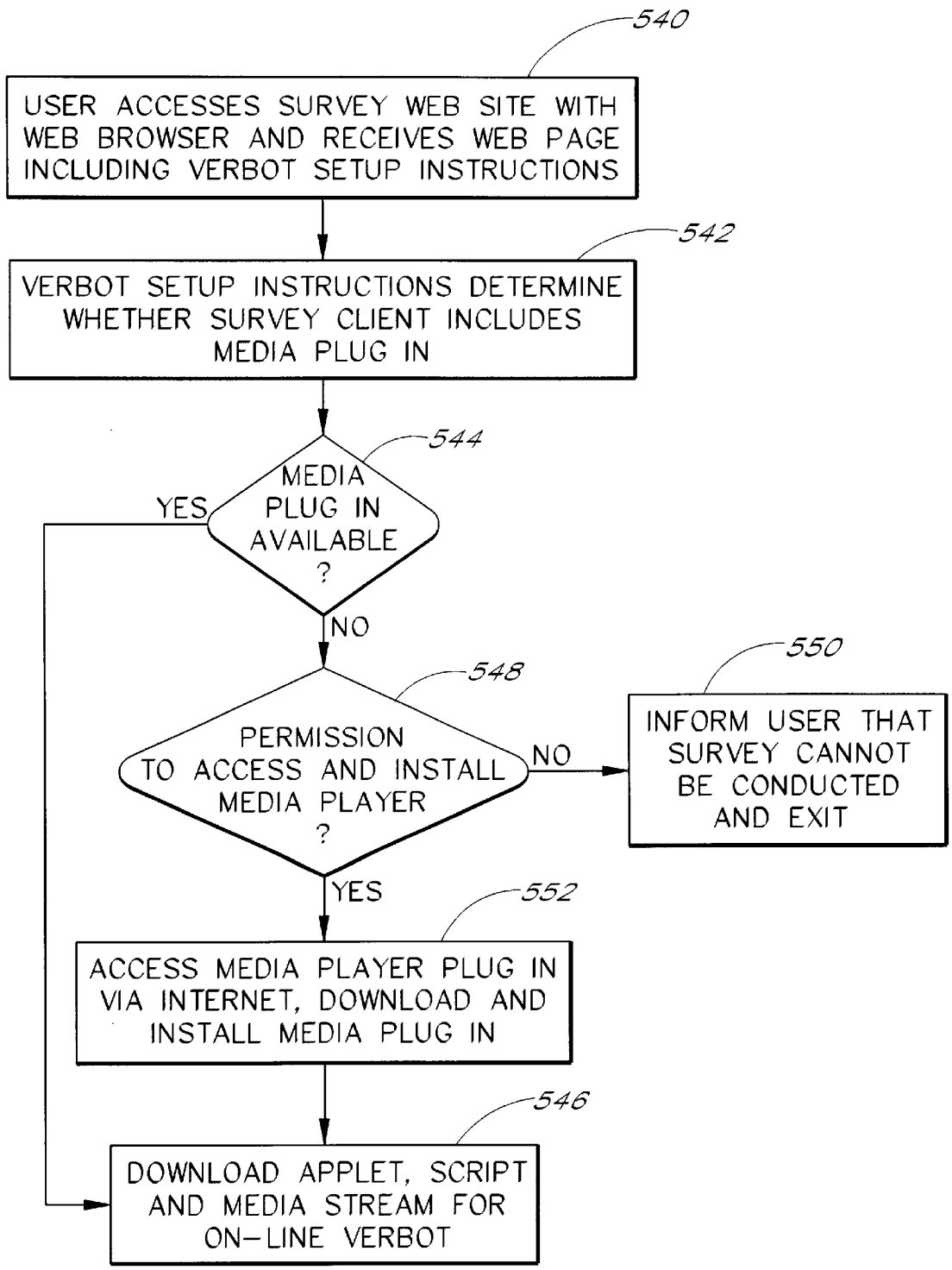
FIG. 5E illustrates steps performed in one embodiment of the present invention to load an embodiment of a Verbot.

FIG. 5E illustrates steps performed in one embodiment of the present invention to load the on-line embodiment of the Verbot 500. In a first step 540, the user, using a web browser, accesses a survey web site hosted by the survey server 300. The survey server 300 transmits a web page, including Verbot 500 setup instructions. In a next step 542, the setup instructions examine the survey client 200 to determine whether it includes an appropriate media plug in, such as, for example, the Flash 4 media player by Macromedia. If, in a step 544, the instructions determine that an appropriate media plug in is available, then, in another step 546, the survey server 300 transmits the JAVA applet, an initial script file 114 and possibly a media stream (including for example initial animation information and/or initial voice information) to the survey client 200. If, in the step 544, the setup instructions determine that a media plug in is not available, the setup instructions, in a step 548, query the user for permission to access and install such a plug in, for example the Flash 4 media player. The Flash 4 media player is widely available, and it will appreciated by those of ordinary skill that it is common for web pages to include instructions to access and install the Flash 4 media player as well as to ask permission for the same. It will be further appreciated that the Verbot 500 of the present invention may interface with other media players and thus the present invention is not limited by a particular media player.

If, in the step 548, the user does not grant permission, then, in a step 550, the setup instructions generate a message informing the user that the survey cannot be conducted and the process terminates. If, in the step 548, the user does grant permission, then, in a next step 552, the survey client 200 accesses an appropriate media plug in via the Internet, and downloads and installs the media plug in. Processing proceeds to the step 546 wherein the survey server 300 transmits the JAVA applet, an initial script file 114 and possibly a media stream to the survey participant's computer.

It will be further appreciated by those of ordinary skill in the art that the Verbot™ 500 can perform predetermined data processing instructions 518 associated with matching all or a portion of user input with an anticipated response coded in a script file 114. The data processing instructions can include basic programming language commands and more sophisticated commands, such as, for example, those permitting file operations (i.e., opening, reading from, writing to, and closing files) and launching other applications and providing command parameters to launched applications. Thus, for example., the Verbot™ 500 can perform data processing instructions to create an answer file 120 and to record in the answer file 120 certain responses provided by the survey participant 118 and recognized by the response parser 506.

Generally, data processing instructions are combined with question data, expression codes and anticipated response patterns in a single script file 114. The script file 114 thus guides the actions of the Verbot™ 500 in conducting a survey. The script file parser 502 of the Verbot™ 500 processes a script file 114 to configure the Verbot 500 to recognize and act on the various instructions and commands that can be included therein.

As will be appreciated by those of ordinary skill, a script file 114 includes a series of rules. Each rule can have a variety of components. The following is a sample rule:

---
<start-0>
a:0.3
p.35 How*doing*today*
p.35 *are*feeling*today*
r:I'm doing well today, thank you
---

Each rule has a title, which is specified between "<" and ">" symbols. Titles can be used to indicate which rules are especially active at any point.

The activation level "a:0.3" resolves conflicts with other rules that may be satisfied by an input string. Thus, if a second rule is also satisfied, but has a lower activation level, say "a:0.2", then it would not be fired, or activated.

Pattern values are indicated by a command prefix, such as "p:35". The pattern value ("35") attaches a relative importance to a specified pattern. A pattern, such as "How doing today", identifies certain text which could be part of an input string (response) supplied by a survey participant 118. Asterisks, "*", are wildcards that can match any or no text. Note, pattern lines are optional and leaving out a pattern will cause the Verbot™ 500 to fire the rule when no matching pattern is found. This can be used to properly respond to input that is not recognized with a statement such as, "I didn't understand what you just said. Can you please re-phrase it for me?"

In order to facilitate easy scripting, pattern value macros for affirmative and negative answers have been formulated. Pattern value macros are commands that automatically recognize a wide variety of possible user responses, such as affirmative (AFF) or negative (NEG) input. As will be appreciated, many other additional macros could be created to make scripting more efficient.

Response strings are identified by "r:". When a rule fires, that is, when a pattern in the rule matches user input and/or when the activation level of the rule is not superseded by another rule, the response string is presented to the survey participant 118. In a preferred embodiment, the response string is sent to and processed by the voice output module to generate voice output to be heard by the survey participant 118. The rule can then be disabled for a predetermined time period.

The following example demonstrates how multiple rules can interact in a script file 114 to advantageously conduct a survey in a conversational and natural way.

---
<survey-0>
a: 0.7
r: Would you like to take a survey?
+: <survey-0-0><survey-0-1>
<survey-0-0>
a: 0.2
p: 50 AFF
r: That's wonderful. I know you're busy, and I really appreciate your time.
−: <survey-0-1>
+: <newsurvey-0>
<survey-0-1>
a: 0.2
p: 50 NEG
r: Oh, that's too bad, maybe we can talk about it again soon. Talk to you next time.
−: <survey-0-0><newsurvey-0>
+: <nosurvey-0>
<newsurvey-0>
a: 0.2
r: Lets talk about the TV show, The Z Papers. Did you watch it last Tuesday?
+: <newsurvey-1>
<nosurvey-0>
a: 0.2
r: It's always good to see you.
---

In the above excerpt from a script file 114, the "+:" code is used to specify which rules will be particularly active if the present rule fires. Thus, for example, the line "+:<survey-0-0><survey-0-1>" indicates that upon inquiring, "Would you like to take a survey?", the Verbot™ 500 will be examining the survey participant's 118 response to look for a match in the patterns specified in the rules titled "<survey-0-0>" and "<survey-0-1>". In this way, the Verbot™ 500 determines if the response was affirmative or negative and gives the appropriate verbal response.

On the other hand, the "−:" code specifies which rules will not be active after the present rule fires. Thus, the Verbot™ 500 can advantageously be scripted to change its sensitivities depending on the survey participant's 118 responses. The on-line version of the Verbot™ 500 uses a scripting language similar to that of the local version of the Verbot™ 500, as described above. In some embodiments of the on-line version of the Verbot™ 500, however, a number of alternative "r:" patterns can be included in a single rule. The following is an example of a rule including several alternative "r:" patterns:

p:35 *how*you*doing*
r: I'm feeling fine.
r: Wow, I feel great.
r: Things are going well.

Moreover, and further advantageously, the Verbot™ 500 can be scripted to control the facial features of a photo-realistic human face to provide the appearance to the survey participant 118 that he or she is conversing with a lively, even entertaining, intelligent entity, which makes the entire survey process more natural, pleasant and enjoyable. The image generator 504 of the Verbot™ 500 can render a photo-realistic human face on a display to show any of a number of possible facial expressions 514A, 514B, 514C, 514D. (FIGS. 5, 5A, 5B, 5C, 5D). In one embodiment of the present invention, the face of the Verbot™ 500 appears in a face window 526 of the user interface window 520. During presentation of any response string, the image generator 504 moves the lips of the photo-realistic human face to even further simulate conversation. Still further, the image generator 504 causes the eyes of the photo-realistic human face to blink at random times, even when no response is being presented to further advantageously provide the survey participant 118 with the feeling that he or she is conversing with a living entity.

An example of a scripted facial expression follows. In some embodiments, expression tags can be used to control the facial expressions of the Verbot™ 500. The following are some examples of expression tags:

*<mouth # duration>

*<eyes # duration>

In the above examples, each # represents a different eyes or mouth frame. The duration field controls the time (in milliseconds, for example) that the expression displayed.

The following table provides a list of some examples of different possible expressions that the Verbot™ 500 can display, together with examples of corresponding mouth and eyes numbers.

| Expression | Eyes | Mouth |
|---|---|---|
| Angry | 5 | 45 |
| Misty look right | 6 | 46 |
| Smirk | 7 | 47 |
| Surprise | 8 | 48 |
| Misty look left | 9 | N/A |
| Duh | 10 | N/A |

For example, the expression tag *<eyes 5 1000> would make the eyes of the Verbot™ 500 look angry for one second (1000 milliseconds). In one embodiment, if the user inputs a −1 in the duration field of the expression tag, then the Verbot™ 500 holds the expression until a new one is input. For example, the expression tag *<eyes 6−1> would hold a misty look until some other eye command is given, such as *<blink>

Expression macros can be used to ease the process of scripting facial expressions. The following are some examples of expression macro tags:

*<smile>

*<blink>

In one embodiment, a pronunciation file can be created and used to correct the pronunciation of certain words by the Verbot™ 500. The following is an example of a list of entries in the pronunciation file:

```
"win98"=(windows 98)
"winnt"=(windows NT)
"win32"=(win 32)
"email"=(e mail)
"http://"=(h t t p ://)
"www."=(w w w dot)
".com"=(dot com)
".org"=(dot org)
".net"=(dot net)
".edu"=(dot e d u)
".gov"=(dot gov)
".mil"=(dot mil)
".html"=(dot h t m l)
".htm"=(dot h t m)
"@"=(at)
```

In the above excerpt from a pronunciation file, the text in quotes is intercepted as it is generated by a firing rule. The text is then translated into what the Verbot™ 500 would actually say. For example, "@" becomes the word "at."

The pronunciation file can also be used to create expression macros. For example, the following entry in the pronunciation file would create an expression macro entitled "frown."

"*<frown>":(*<eyes 5 2000>)

In the above example, when the frown expression macro is fired, the eyes of the Verbot™ 500 go into a frown position and stay for 2000 milliseconds. The following example demonstrates how expression macros can be used in scripting a Verbot™ 500.

a: 0.3 p: 35 *how*are*you* r: *<smile> I'm really doing well.

When the above rule is fired, the Verbot™ 500 smiles and says, "I'm really doing well."

In the on-line embodiment of the Verbot 500, the script file 114 is preferably transmitted to the survey client 200 with the JAVA applet, which includes the script file processing module. In another embodiment, it is contemplated that the script file 114 may be parsed on the survey server 300 to create a JAVA applet, which is preconfigured to follow all instructions and commands in the script file 114. Thus, when the JAVA applet is loaded on the survey participant's 118 computer, it can determine which script rule fires as a result of his or her response.

Figure 5F:
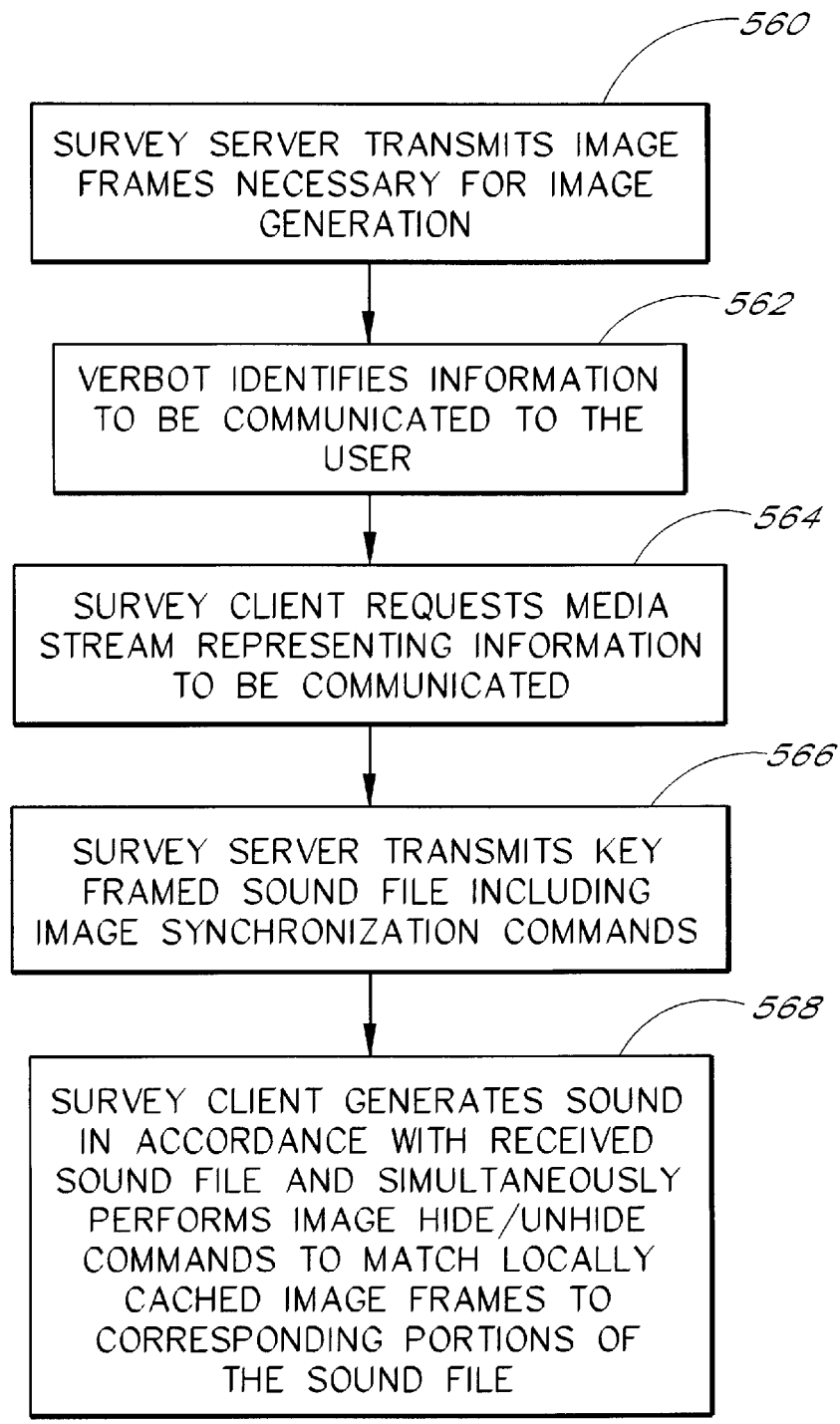
FIG. 5F illustrates steps performed in one embodiment of the present invention to generate character images in one embodiment of a Verbot.

FIG. 5F illustrates steps performed in one embodiment of the present invention to generate character images with the on-line Verbot 500. In a first step 560, the survey server 300 transmits to the survey client 200 all image frames necessary for image generation, such as, for example, for eye blinking, lip synchronization and facial expression changes. In one embodiment, these image frames are transmitted to and locally cached at the survey client 200 along with the initial transmission of the JAVA applet and the initial script file 114. In a next step 562, the on-line Verbot 500 identifies information to be communicated to the survey participant 118.

In one embodiment, voice data representing the information to be communicated resides on the survey server 300, and, in a further step 564, the survey client 200 issues a request for a media stream including the voice data. The media stream may be a key framed sound file. In a next step 566, the survey server 300 transmits the key framed sound file including commands to match certain frames, for example lip-synch frames, to the voice output represented in the sound file.

To display the image frames in sequences which create desired animation, the sequential display of frames is controlled using hide and unhide operations. Thus, for example, the Verbot 500 generates a character image whose lips may be synchronized to spoken words by sequentially hiding a current frame, unhiding a next frame, hiding that frame, unhiding a further frame, and so on until the desired animation is complete. Preferably, key framed sound files requested by the JAVA applet from the survey server 300 streams commands that match the lip-synch frames to voice output provided in the sound file.

In a step 568, the survey client 200 performs hide/unhide operations at around, in one embodiment, 13 operations per second to match locally cached lip-synch frames. In the step 568, the survey client 200 also simultaneously generates sound by processing the sound file, which processing will be familiar to those of ordinary skill in the art. Those of ordinary skill will further appreciate that existing browser plug-ins, for example Flash 4, may be directed to perform such hide and unhide operations. The on-line Verbot 500, thus, in one embodiment, generates a character image appearing to communicate information to a user.

When the on-line embodiment of the Verbot 500 uses voice output, the JAVA applet requests pre-recorded voice sequences to be transmitted from the survey server 300 to the survey client 200 on demand. In another embodiment, the Verbot 500 may transmit digital data sequences representing text characters to a voice synthesis module, which renders analog audio output in a form approximating a human voice speaking words corresponding to the text characters.

In some embodiments of the present invention, the image generator 504 generates faces likely to be known to the survey participant 118. Thus, for example, in conducting a survey for a television show, the image generator 504 could advantageously generate the face of a character from the television show. Furthermore, the voice output module could be modified to produce a voice like that of the character. In this manner, the survey participant 118 more easily identifies with the survey process, is more interested, and the entire process is rendered more entertaining and enjoyable. In turn, this advantageously increases:both the attention that each survey participant 118 will give the survey as well as the number of participants that will take the survey.

In some embodiments, a branded character, such as a famous animated cartoon character, can be simulated using Verbot™ technology. When possible, the character's actual voice can be used and the Verbot™ 500 could be scripted to act in a manner consistent with the original character. It is contemplated by the inventors that, in still other embodiments, the image generator 504 generates fictitious, historic, legendary or fantasy character images, such as, for example, Huckleberry Finn, Abraham Lincoln, Michelangelo, Hercules or Bugs Bunny. In even further embodiments, the image generator 504 generates character images representing animals, which may include any life form, such as, for example, dogs, cats, mice, or other mammals, reptiles, amphibians, fish, mollusks, crustaceans, birds, spiders, insects and even microscopic and invertebrate life forms. In still further embodiments, the image generator 504 generates character images representing inanimate objects, such as, for example, toys, cars, computers, rocks, clouds, etc. As will be appreciated, the present invention is not limited by a type of character that can be generated by the image generator 504. The inventors contemplate further that images representing two or more characters may be generated to provide participants with the experience of communicating with two or more characters in a single conversational episode. The inventors further contemplate that the image generator 504 generates images representing a character signing in sign language to communicate with hearing impaired survey participants 118.

Operation of System and Method

Figure 6:
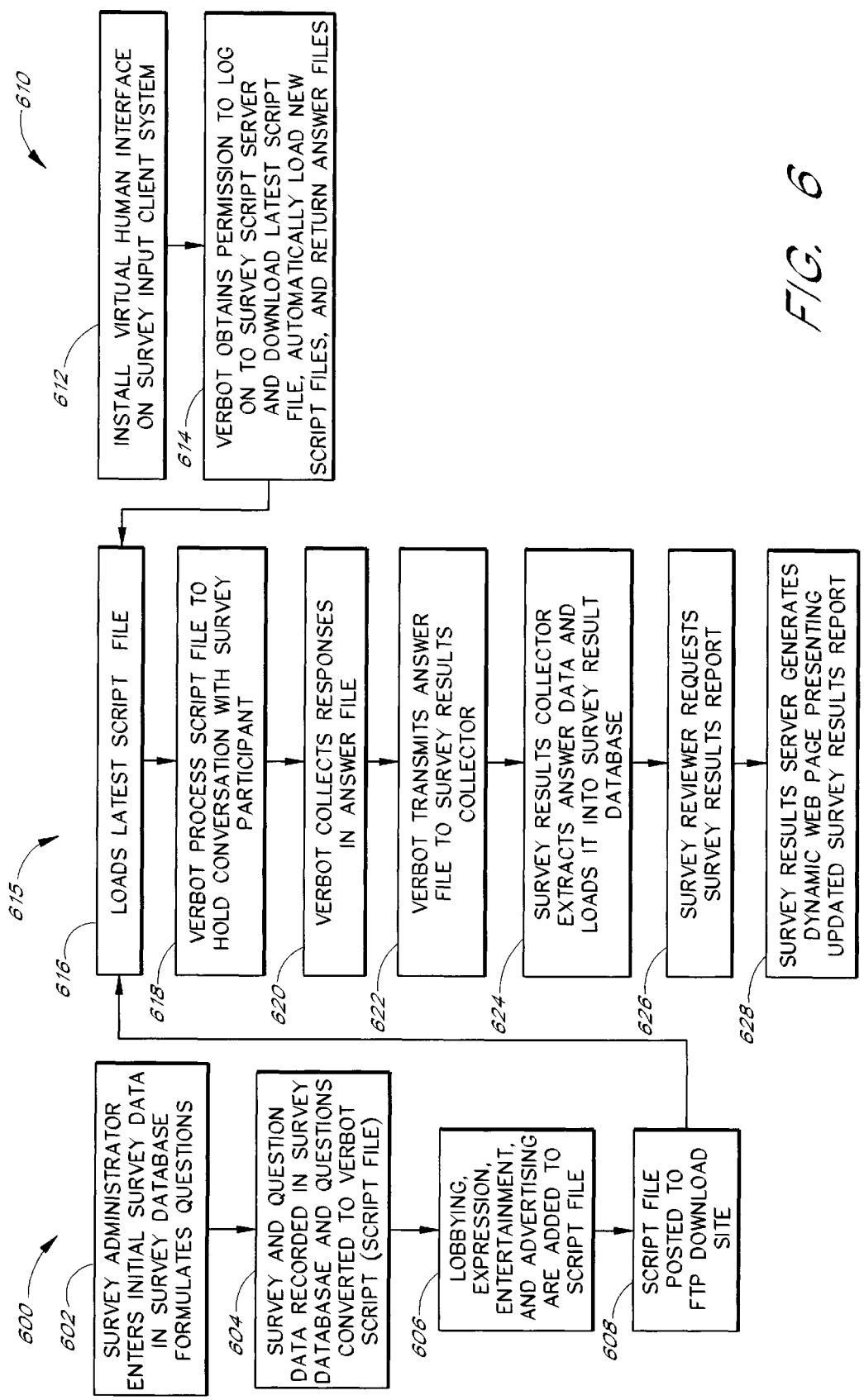
FIG. 6 is a flow chart illustrating a representation of the overall operation of a survey system in accordance with one embodiment of the present invention.
Figure 7A:
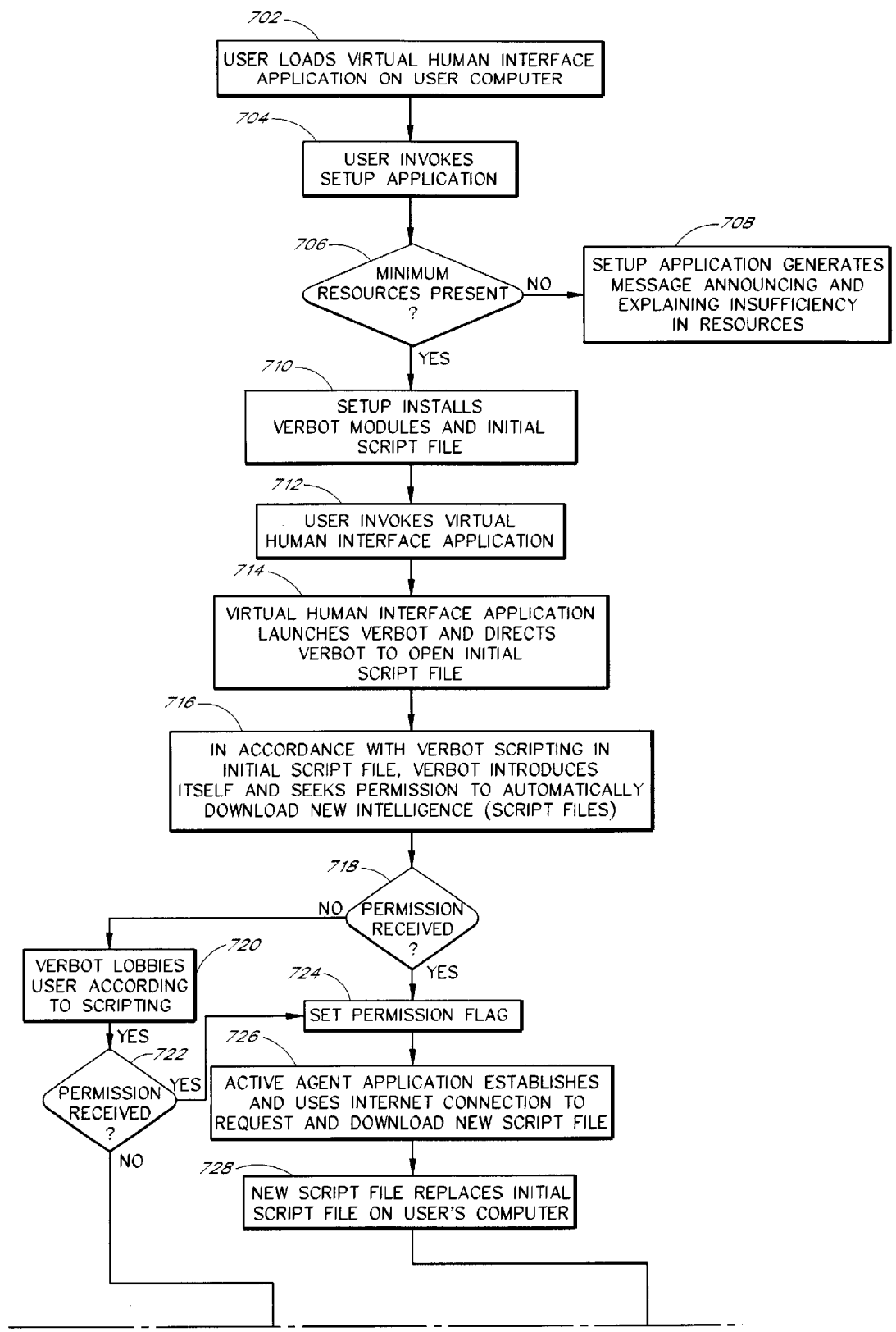
FIGS. 7A through 7E are a series of flow charts showing the operation of one embodiment of a survey system in accordance with the present invention.
Figure 7B:
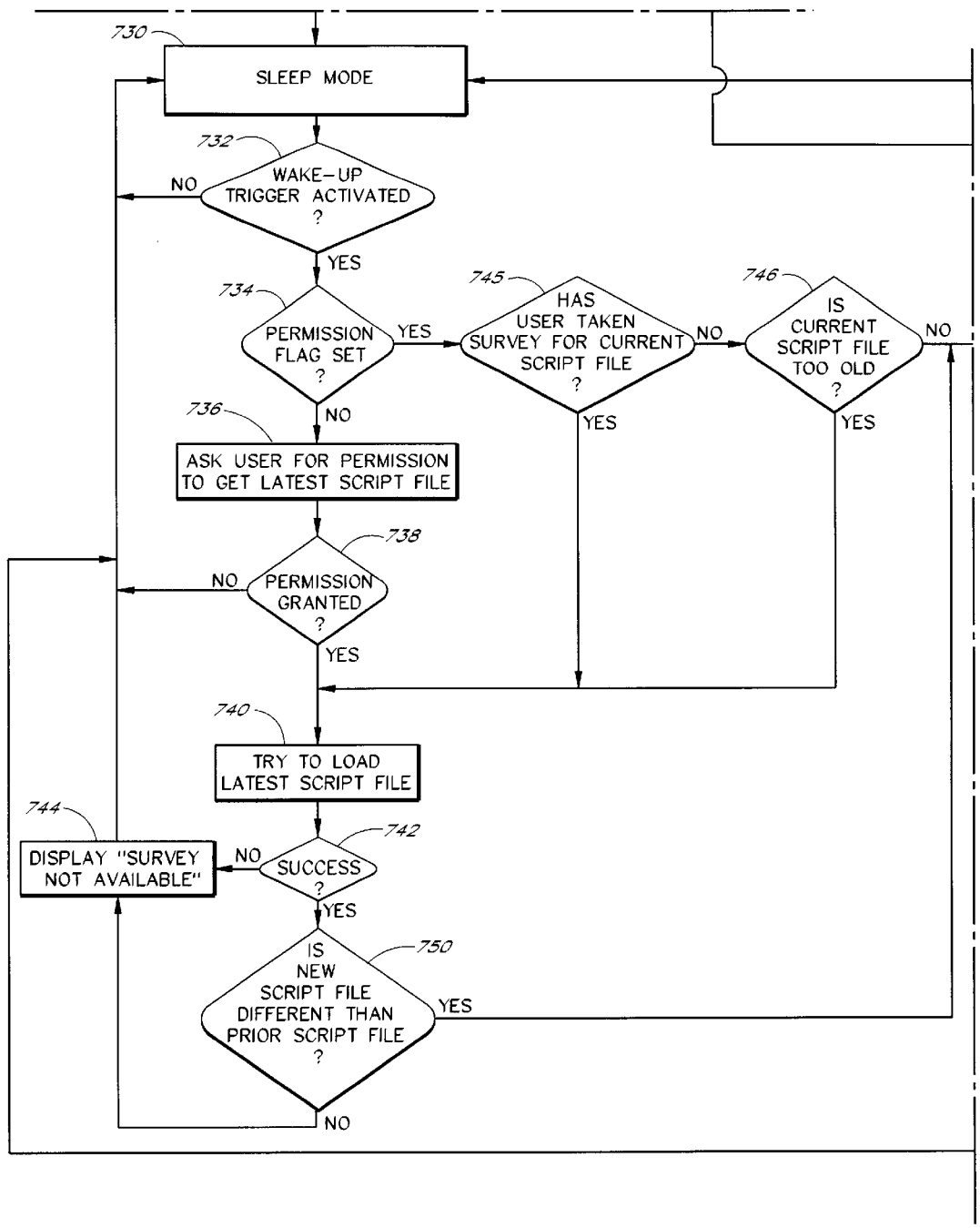
Figure 7C:
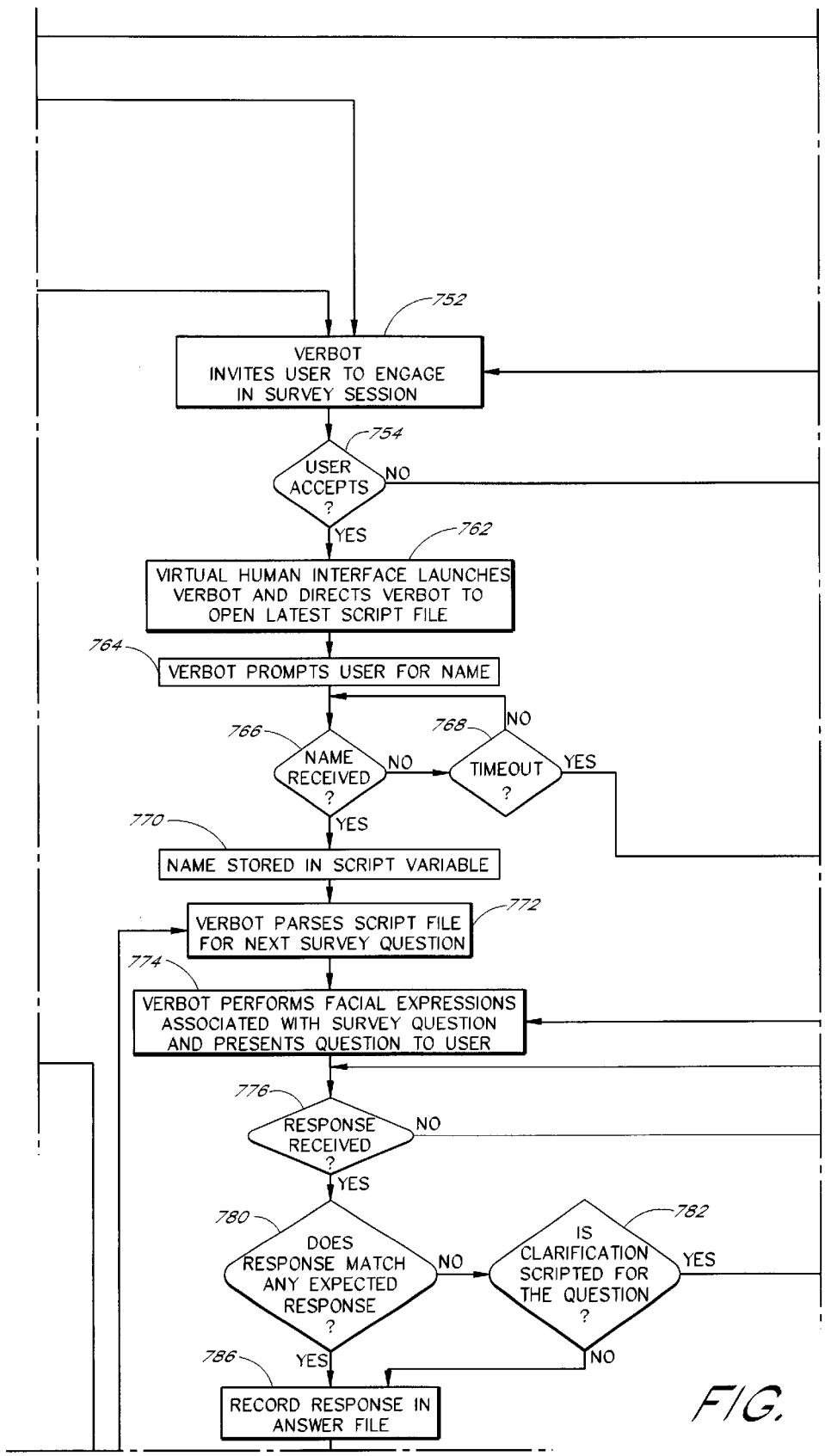
Figure 7D:
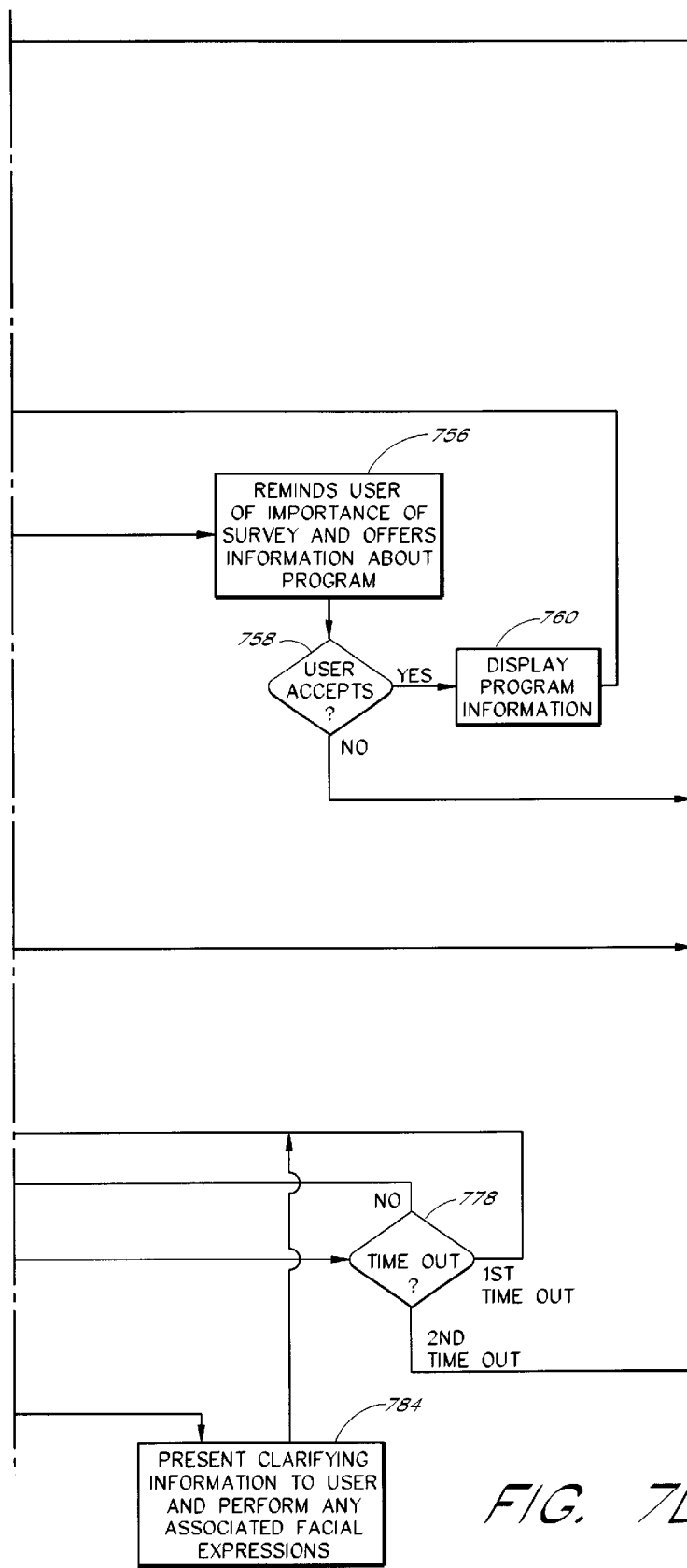
Figure 7E:
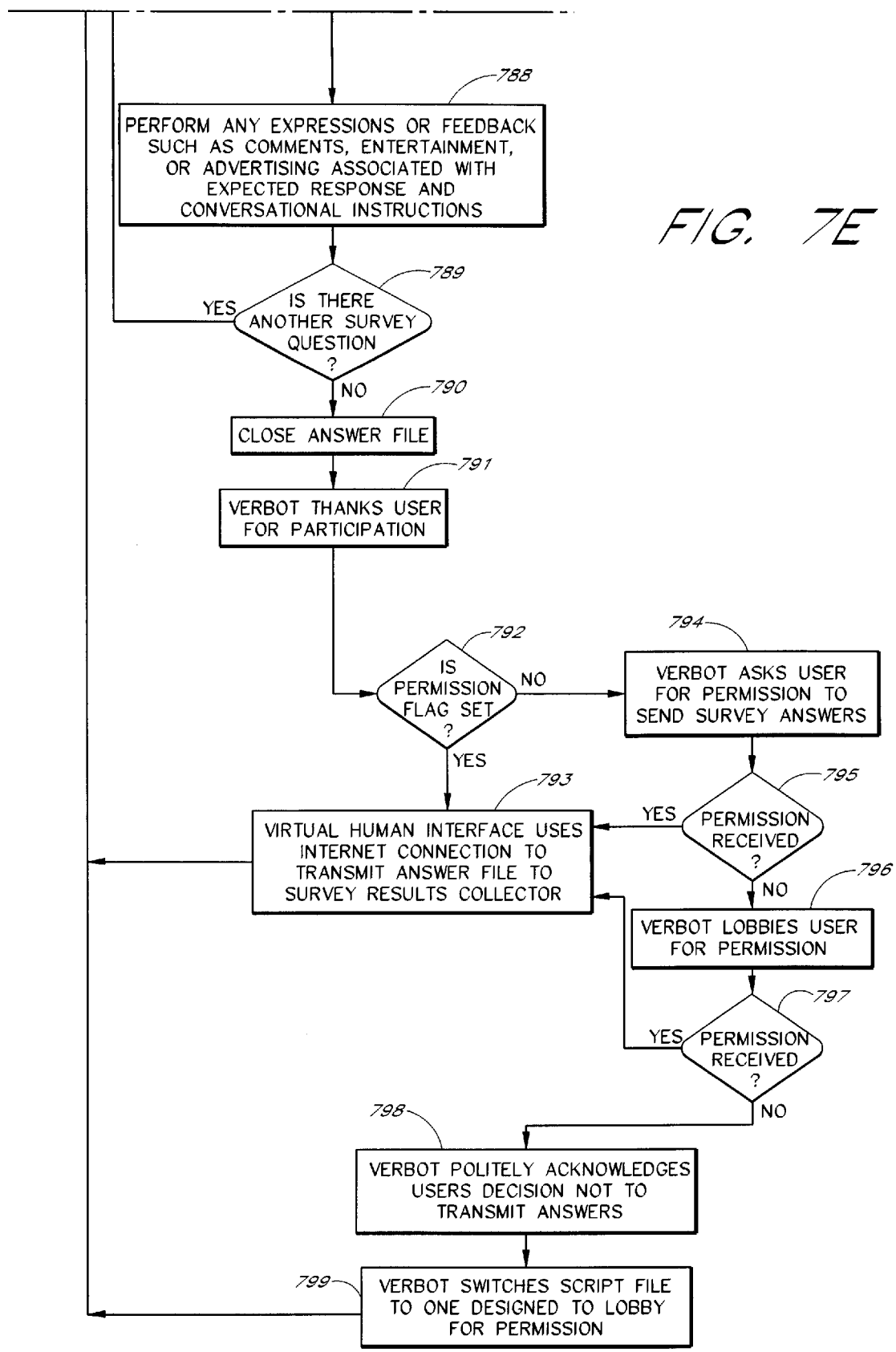

FIG. 6 illustrates a flow chart describing the overall operation of one embodiment of a survey system 100 in accordance with the present invention. In a first step 602 of a first series 600 of steps, a survey administrator populates the survey database 122 with information about one or more sponsors and provides initial user and password data for each sponsor as described above.

In a preferred embodiment, a survey sponsor uses a limited survey database management application to enter new survey and question data for a new survey. After authenticating the sponsor by password and determining the SPONSOR_ID for the sponsor, the limited survey database management application offers the sponsor a choice of table subject matter on which to perform operations, such as, for example, to browse, modify, add or delete (1) Survey Information, (2) Survey Question Information, (3) Answer Information, (4) Answer Format Information, or (5) Survey Participant Information. Using techniques described above, a survey sponsor can add survey and question data to the survey database 122.

In a preferred embodiment, a specialized application called a survey entry application is designed to simplify the introduction of a new survey into the survey database 122. After authenticating the sponsor as described above, the survey entry application, which is operatively connected to the computer hosting the survey database 122 (directly or by network), prompts the survey sponsor to enter a survey title in a survey title text field and to enter a brief description of the purpose of the survey in a survey description field. When the survey sponsor selects an OK button, the survey entry application creates a new record in the SURVEY_TABLE, incrementing the highest number already used to identify a survey and assigning it to the SURVEY_ID field, assigning the SPONSOR_ID value for the sponsor to the SPONSOR_ID field, the entered title text to the SURVEY_TITLE field, and the entered description to a SURVEY_DESCRIPTION field.

The survey entry application then prompts the sponsor to enter question data for the survey. The survey sponsor then enters the text for a survey question in a question text field. Then, to specify a format to present the collected answers, the survey sponsor activates a pull-down menu presenting a list of answer format descriptions extracted from the ANSWER_FORMAT_TABLE. The survey sponsor chooses one the sponsor believes will best format the group of answers collected for the question. For example, one description may read "place all answers in a sequential list" and another may read "choose the five responses most frequently given and show the percentage of users providing the respective response." It will be understood that the best way of representing answer data may differ depending on the nature of the answer data, for example, numeric answer data, text answer data, true/false answer data.

When the sponsor selects an answer format, the survey entry application places the associated ANSWER_FORMAT name in the answer format field. Upon selecting an OK button, the survey entry application creates a new record in the QUESTION_TABLE by calculating and assigning a new question identifier (e.g., "Q0001" for the first question in a survey, "Q0002" for the next question, and so on) to the QUESTION_ID field, assigning the answer format name to the ANSWER_FORMAT field, assigning the SURVEY_ID to the SURVEY_ID field, assigning the entered question text to a QUESTION_TEXT field. The survey entry application prompts the sponsor to enter another question or finish. The sponsor enters as many questions as desired for the survey and, when done entering questions, selects finish. The survey entry application generates a new survey report showing the title of the new survey, the newly generated survey ID, and, for each question entered, the question ID followed by the text of the question.

In a next step 604, a survey scripter uses the new survey report to encode the survey questions into a script file 114. To facilitate automated processing of answers provided by survey participants 118, the survey scripter also includes commands in the survey script file 114 to cause participants' answers to be recorded in an answer file along with the QUESTION_ID of the corresponding question. Also, the survey scripter includes in the script file 114 commands which cause the SURVEY_ID to be written at the beginning of the answer file. Such a command might be *<input=[SURVEY_ID=01123]>. The scripter may also add some initial scripting to ask the survey participant 118 whether he or she would mind providing some personal information such as, for example, name, geographic location, computer configuration, how many surveys he or she has completed, etc. The scripter may add commands that cause the participant data to be written to the answer file 120.

Additionally and advantageously, the survey scripter in a next step 606, either alone or collaboratively with the survey sponsor, adds expression, entertainment, lobbying and/or advertising elements to the script file 114. In another step 608, the scripter posts the script file 114 to the survey script server 104.

When the local embodiment of the Verbot™ 500 is used, the Verbot™ 500 can be preprogrammed with a specific URL address from which to obtain new script files 114 from the survey script server 104. When several different surveys are run at the same time, each script file 114 can be assigned a unique URL address. Furthermore, each script file 114 can be annotated with information regarding the survey to which it is targeted. In this way, the script file 114 is advantageously unlikely to be posted to the wrong URL address and, hence, be transmitted to the wrong survey participant 1 18.

When the on-line embodiment of the Verbot™ 500 is used, the Verbot™ 500 and the script file 114 are available via a URL address, which the survey participant 118 can access from any location having a suitable Internet browser. In the on-line embodiment of the Verbot 500, or alternatively in the local embodiment of the Verbot 500 running on the survey client 200 which has a current network connection with the survey server 300, the Verbot 500 can immediately access and load a new script file 114 in response to a predetermined event.

For example, if, during a survey conducted using an initial script file 114, the user indicates some interest in a different program, the Sapphire™ class Verbot™ can immediately download a new script file which provides information about or even conducts another survey about the different program. This process is initiated with a command such as *<loadscript=premiumprogram.script>. This new script file 114 may advantageously contain intelligence (rules) addressing the user's indicated interests and, thus, provide a more dynamic and enjoyable experience for the user. When the new script file 114 loads, the Verbot 500 can say: "I've loaded some new information about the information you requested. Go ahead and ask your questions now." When this portion of the interaction is complete, the Verbot 500 can reload the original script file 114 and continue or load a third or additional script file 114 requested by a rule.

The following example illustrates rules which accomplish the loading of a script file dynamically:

```
<premium-1>
a:0.3
p:35 *what*tell*premium*
p:35 *can*about*premium*
p:35 *premium*progra*
r:I can tell you all about the new premium program, but wait a second
while I check the latest. *<loadscript=premiumprogram.script>
r:I'm glad you asked, let me check with my server for the latest, then I'll
answer your questions. *<loadscript=premiumprogram.script>
r:We do have a premium program, I need to check in with my server to
see what the latest information is. *<loadscript=premiumprogram.script>
Rules in the premiumprogram.script could be coded as follows:
<return-1>
a:0.5
r:Does that answer your questions?
+:<retyes-1><retno-1>
<retyes-1>
a:0.0
p:35 AFF
```

-continued

```
r:Good, lets get back to where we were then.
*<loadscript=original-r.script> (note that original-r is the same as the
original script but starts with a comment designed to reorient the user)
<retno-1>
a:0.0
p:35 NEG
r:Okay, ask me anything you like about the premium program and I'll do
my best to answer you.
```

Thus, dynamic script file 114 loading may be used to facilitate adapting to a user's interests during a survey. Those of ordinary skill will further appreciate that the ability to load script files 114 dynamically provides the additional advantage of breaking a larger script into multiple component scripts to keep any single script relatively small, which, in turn, may reduce script download times. It will be appreciated that reduced download times provided a better user experience, particular in circumstances -where transmission bandwidth is limited.

When the local embodiment of the Verbot™ 500 is used, a second series 610 of steps is performed independently of the first series 600 of steps. In a first step 612 of the second series 610 of steps, a user installs a virtual human interface application 116 on the survey input client 106. In a next step 614, the virtual human interface application 116 obtains permission from the user to periodically log on to the survey script server 104 and automatically download the latest script file 114. The virtual human interface application 116 also obtains permission to automatically return answer files 120 to the survey results collector 108 upon completion of future surveys.

After the first series 600 and second series 610 of steps are completed, the survey system 100 proceeds to a third series 615 of steps. When the local embodiment of the Verbot™ 500 is used, the survey input client 106, in a first step 616 of the third series 615 of steps, loads the latest script file 114 from the survey script server 104. As described above, when the on-line embodiment of the Verbot™ 500 is used, the Verbot™ 500 does not need to load the script file 114 from the survey script server 104; rather, in the step 616, the survey server 300 simply loads a JAVA applet on the survey input client 106 when the survey participant 118 accesses the web page associated with the survey. The JAVA applet interfaces the survey participant 118 to the Verbot 500 hosted by the survey server 300.

In a next step 618, the Verbot™ 500 processes the script file 114 to conduct a survey with the survey participant 118, during which the Verbot™ 500 advantageously entertains, lobbies with, and advertises to the survey participant 118 in accordance with scripting in the script file 114 and records responses in an answer file 120. In another step 620, the virtual human interface application 116 closes the answer file 120 to thereby collect all the responses of the survey participant 118 in the answer file 120.

The survey input client 106, in a step 622, transmits the answer file 120 to the survey results collector 108 over the network 102. In a further step 624, the survey results collector 108 parses the answer file 120, extracts the answer data, and stores the data in the survey database 122.

In another step 626, a survey reviewer 124 requests a survey results report 126 from a survey results server 110. In a next step 628, the survey results server 110 extracts answer data for the requested survey from the survey database 122, dynamically generates the survey results report 126, and transmits it to the survey reviewer 124.

FIGS. 7A through 7E are a series of flow charts representing the operation of a survey system 100 in accordance with one embodiment of the present invention using the local version of the Verbot™ 500. In a first step 702, a user loads a virtual human interface application 116 on the survey input client 106. In a next step 704, the user invokes a virtual human interface setup application.

In another step 706, the virtual human interface setup application can determine whether the survey input client 106 has sufficient resources to support the virtual human interface application 116. If the survey input client 106 lacks sufficient resources to support the virtual human interface application 116, then, in a step 708, the virtual human interface setup application generates a message announcing and explaining the insufficiency of resources to the user. Otherwise, the virtual human interface setup application, in another step 710, installs the virtual human interface application 116 and an initial script file 114 on the survey input client 106.

In a step 712, the user invokes the virtual human interface application 116. In a next step 714, the virtual human interface application 116 launches a Verbot™ 500 and directs the Verbot™ 500 to open the initial script file 114. In a next step 716, the Verbot™ 500, in accordance with the scripting contained in the initial script file 114, introduces itself and interactively seeks permission from the user to periodically download new script files 114 and upload answer files 120 automatically. In a further step 718, the Verbot™ 500 determines whether the user grants permission.

If the user does not grant permission, then the Verbot™ 500, in a next step 720, advantageously lobbies the user to grant permission according to the scripting contained in the initial script file 114. In a step 722, the Verbot™ 500 determines whether the user grants permission after the lobbying.

The following is an example of lobbying:

Verbot™: May I download the latest intelligence now?

User: No, I don't want you to.

Verbot™: Why not?

User: Because I'm concerned about the expense.

Verbot™: The intelligence file downloads very quickly. On your connection, it should take no more than 18 seconds. Besides, my current script is very limited. I think you'll enjoy the new stuff.

User: I'm not sure.

Verbot™: One more thing to consider is that I'm giving you direct access to the programming department at Galaxy Network. That is power most people wish they had.

User: Well, okay, then. But don't stay on-line any more than you have to.

Verbot™: Excellent, I know you'll be pleased with your decision.

Those of ordinary skill will appreciate that the lobbying, such as that illustrated above, can be facilitated by rules coded in a script file 114, which anticipate and respond to certain user responses.

If the user grants permission after the initial request or after the lobbying, then, in a next step 724, the virtual human interface application 116 sets a permission flag. Otherwise, the virtual human interface application 116 proceeds to a step 730 without setting the permission flag.

In a preferred embodiment, the permission flag is implemented in the software of the virtual human interface application 116. When the permission flag is set, the virtual human interface application 116 can bypass the permission request for each individual access. Thus, the virtual human interface application 116 can automatically download new script files 114 on a regular basis. The automatic download can be set to occur at some predetermined repeating time interval or can be set to trigger upon the detection of some triggering event, such as a user log on. An appropriate method can be selected based on the user's individual circumstances. For example, for workstations and PCs that remain turned on most of the time, the automatic download is preferably set to occur at some predetermined repeating time interval.

If the user grants permission, then, after completing step 724, the virtual human interface application 116, in a next step 726, directs the survey input client 106 to download a new script file 114 from a survey script server 104 over the network 102. In one embodiment, this is done by launching an Internet browser and providing it with a command line instruction to access a script file 114 from a site hosted by the survey script server 104. It will be appreciated that a script file 114 may be downloaded via FTP, or other file transfer protocol. The virtual human interface application 116 stores the script file 114 in a predetermined directory on the survey input client 106 once the script file 114 is received. In a next step 728, the new script file 114 replaces the initial script file 114 on the survey input client 106. In a further step 752, as described in more detail below, the Verbot™ 500 invites the user to participate in a survey.

If, in the step 722, the user does not grant permission, then the virtual human interface application 116, in the step 730, waits in a noninteractive "sleep" mode without setting the permission flag. While in the noninteractive sleep mode, the virtual human interface application 116, in a step 732, monitors a wake-up trigger to determine whether the trigger has been activated. Alternatively, a timer is set and monitored by the operating system with the virtual human interface application 116 set to be launched upon the detection of the timer expiration event. Either way, the wake-up trigger may be configured to activate automatically at recurring intervals of some predetermined time period. Alternatively, the wake-up trigger may be configured to activate in response to some predetermined user input or activity, such as a mouse or keystroke event. If the wake-up trigger has not been activated, the virtual human interface application 116 remains in the noninteractive sleep mode of step 730.

In another embodiment, the virtual human interface application 116 generates a scaled-down version of the human-like face displayed by the Verbot™ 500, and displays the scaled-down face, for example, in a corner of the display. Further, the virtual human interface application 116 advantageously uses the voice output module to generate teaser statements, enticing the user to take a survey. Any user input activity, such as a mouse or keystroke event may activate the wake-up trigger.

Once the wake-up trigger is activated, the virtual human interface application 116, in a step 734, determines whether the permission flag has been set. If the permission flag has not been set, then the Verbot™ 500, in a next step 736, requests permission from the user to download a new script file 114 from the survey script server 104. If the user does not grant permission, then the virtual human interface application 116 returns to the noninteractive sleep mode of step 730. If the user grants permission, then the virtual human interface application 116, in a next step 740, directs the survey input client 106 to attempt to download a new script file 114 from the survey script server 104.

In a next step 742, the virtual human interface application 116 determines whether the attempted download was successful. In some embodiments, the virtual human interface application 116 determines the success of the download by comparing the content of the old script file 114 with that of the newly downloaded script file 114. If the contents of the two script files 114 differ, then the virtual human interface application 116 determines that the download of the new script file 114 was successful.

If the download was not successful, then the virtual human interface application 116, in a step 744, generates and displays a message indicating that a survey is not available. This can be used to encourage the user to actively download the new script file 114. The virtual human interface then returns to the noninteractive sleep mode of step 730. If the download was successful, then processing continues to a step 750.

If, during step 734 the virtual human interface application 116 determines that the permission flag has been set, then the virtual human interface application 116, in a next step 745, determines whether the user has already completed the survey included in the current script file 114 by checking a flag that is set at completion of each survey and is reset at the loading of a new script file 114. If the user has not completed the survey, then the virtual human interface application 116, in a step 746, determines whether the survey included in the current script file 114 is too old to conduct by referencing its last date and checking the current system date. When the difference between the dates exceeds a predetermined period of time, for example, two weeks, the current script file 114 is determined to be too old If the survey included in the current script file 114 is too old or if the user has already completed the survey included in the current script file 114, then the virtual human interface application 116 proceeds to the step 740, as discussed above.

In the step 750, the virtual human interface application 116 determines whether the new script file 114 is different than the previous script file 114. If the new script file 114 is the same as the previous script file 114, then the virtual human interface application 116 generates and displays a message indicating that a survey is not available in the step 744, as described above. The virtual human interface application 116 then returns to the noninteractive sleep mode of step 730.

If the new script file 114 is different than the previous script file 114 or if, during step 746, the virtual human interface application 116 determines that survey included in the current script file 114 is not too old to conduct, then the Verbot™ 500, in a next step 752, invites the user to participate in a survey. In a step 754, the Verbot™ 500 determines whether the user accepts the invitation. If the user does not accept the invitation, then, in a next step 756, the Verbot™ 500 lobbies the survey participant 118, preferably reminding her of the importance of the survey, and offers to show her information about the program. In another step 758, the Verbot™ 500 determines whether the survey participant 118 wants program information. If the survey participant 118 does not want program information, then processing returns to the noninteractive sleep mode of step 730.

If, in the step 758, the user accepts the offer, then, in a next step 760, the virtual human interface application 116 displays the offered program information by opening a regularly updated web page containing the information of interest. Processing then returns to step 752, where the Verbot™ 500 again invites the user to participate in the survey. If, during step 754, the Verbot™ 500 determines that the user accepts the invitation to participate in the survey, then the virtual human interface application 116, in a further step 762, directs the survey input client 106 to open the current script file 114.

In one embodiment, the Verbot™ 500, in an optional step 764, prompts the survey participant 118 to input his or her name. In alternative embodiments, the survey participant 118 will preferably remain anonymous, being identified only by certain demographic information. In an optional step 766, the Verbot™ 500 determines whether the survey participant 118 has input a name. If the survey participant 118 has not input a name, then, in a next step 768, the Verbot™ 500 determines whether a time out has occurred. In one embodiment, a time out occurs if the user has not entered a response in 90 seconds. Those of ordinary skill in the art will appreciate that other time out time periods may be used with the present invention.

If a time out has occurred, then processing returns to the noninteractive sleep mode of step 730. If, during the optional step 766, the Verbot™ 500 determines that the survey participant 118 has input a name, then the Verbot™ 500, in an optional step 770, stores the name as a text string variable.

In a next step 772, the virtual human interface application 116 parses the current script file 114 for the next survey question. In a preferred embodiment, each survey question is associated with one or more rules in a script file 114, and the content of the question may correspond to a response line in a script file 114. The following is an example of a rule containing survey question information:

a: 0.6 r: What is your favorite coffee?

*<input=[Q0001]$>

In a step 774, the Verbot™ 500 presents the question to the survey participant 118 and advantageously displays any facial expressions associated with the question. In a next step 776, the Verbot™ 500 determines whether the survey participant 118 has provided a response. If the survey participant 118 has not yet provided a response, then the Verbot™ 500, in a next step 778, determines whether a first or second time out has occurred. If, after some predetermined time period, a first time out has occurred, then processing returns to step 774, where the Verbot™ 500 again presents the question to the survey participant 118 and displays the expression associated with the question. If, after a second predetermined time period, a second time out has occurred, then processing returns to the noninteractive sleep mode of step 730.

In a preferred embodiment, no survey results are transmitted to the survey results collector 108 until the survey participant 118 has completed the entire survey. In addition, the virtual human interface application 116 will not download new information until the current survey has been completed. If the survey participant 118 opts not to finish a survey, then the virtual human interface application 116 preferably declines to download new information or share any reward information or other incentives with the survey participant 118. In alternate embodiments, it is not necessary for every survey participant 118 to complete every survey. Information relating to completed or partially completed surveys such as, for example, percentages, may be included in the survey results report 126.

If, during step 776, the Verbot™ 500 detects a user input, then, in a next step 780, the Verbot™ 500 determines whether the response matches any expected response. Preferably, the response parser 506 scans the response string provided by the survey participant 118 and identifies all rules, from the set of active rules, having a specified pattern that matches all or part of the response string. The Verbot™ 500 then scans the activation levels attached to each of the identified rules and fires the rule that has a matching pattern and has the highest activation level.

If the response string does not match any expected response, then the virtual human interface application 116, in a next step 782, determines whether the script file 114 contains scripted clarification regarding the survey question. In some embodiments, specific clarification rules are created to clarify a particular survey question or issue. A hierarchy of specific clarification rules can be established by using the plus(+) sign to fire the clarification rules in a predetermined sequence. The following are some examples of specific clarification rules organized in a hierarchy:

--- r: Did you like the way Joan handled Billy's obsession with Diane?
+: <obsession-1><obsession-2><obsession-3>
<obsession-1>
a: 0.0
p: 35 AFF
r: Very interesting. So you like it when women are strong?
−: <obsession-2><obsesion-3>
+: <strongw-1><strongw-2><strongw-3>
<obsession-2>
a: 0.0
p: 35 NEG
r: Very interesting. You appear to be uncomfortable with Joan acting in a decisive manner. Is this true?
−: <obsession-1><obsession-3>
+: <weakw-1><weakw-2><weakw-3>
<obsession-3>
a: 0.0
r: I'd appreciate if you'd give me either a yes or a no type answer about Joan's handling of Billy.

---

In the above example, the first two obsession rules have not been deactivated in the third obsession rule. By leaving the first two obsession rules active, the survey participant 118 is given a second chance to respond to the survey question.

In some embodiments, the script file 114 includes rules having no pattern and relatively high activation levels, such as above 5.0, that will fire when no expected response is found. Such rules can advantageously offer general clarification information to the survey participant 118, which may be needed in the case when the response string does not match any expected pattern.

Once a general clarification rule fires, it can be disabled for a predetermined time period, such as approximately 20 minutes. In this way, a hierarchy of general clarification rules can be established. The following are some examples of general clarification rules organized in a hierarchy:

a: 0.5
r: I didn't expect what you just input. Can you please try again?
a: 0.49
r: Oh, wow, that's the second time I didn't understand what you're typing. I'm really sorry. Can you try that again?

If, in the step 782, it is determined that the script file 114 contains an appropriate clarification rule, then the Verbot™ 500, in a next step 784, presents the scripted clarification information to the survey participant 118, and generates images to show any facial expressions associated with the clarification information. Processing then returns to step 774, where the Verbot™ 500 again presents the survey question to the survey participant 118 and displays any facial expression associated with the question.

If, during step 780, the Verbot™ 500 determines that the response received from the survey participant 118 matches an expected response or if, in the step 782, it is determined that the script file 114 does not contain an appropriate clarification rule, then the virtual human interface application 116. in another step 786, records the response in an answer file 120 corresponding to the survey participant's 118 name or code. For example, if in response to the survey question, "What is your favorite coffee?", the survey participant 118 types, "Maxwell House," then the following entry would be added to the appropriate answer file 120:

Q0001=Maxwell House;

The "<input=" tag is used to save the response the user enters. The command "*<input=[Q0001]$>" combined with the user's response of "Maxwell House" causes the entry "Q0001=Maxwell House;" to be saved in the answer file 120. It will be appreciated that the "<input=" tag should preferably, but not necessarily always, be used in rules including patterns indicating that the user has entered an acceptable response. In alternative embodiments, the survey participants' 118 answers may be saved along with descriptive indicators of the question response such as "favcoffee=Maxwell House;". Those of ordinary skill will appreciate that applications processing answer files 120 having descriptive indicators of questions can easily parse and process such files to present results to survey reviewers.

Advantageously, a script may be coded to categorize user responses in predetermined categories. The following example shows just one way that a wide variety of responses to a single question may be categorized into a relatively few, but useful categories. This can be beneficial, particularly when every user's response is likely to differ from that of any other user.

--- r: Can you tell me, just briefly, how you feel about commercial breaks?
+: <br_st_neg><br_wk_neg><br_neut>
<br_wk_pos><br_st_pos><br_unclear>
<br_st_neg>
a: 0.0
p: 15 *hate*
p: 15 *awful*
p: 15 *ridiculous*
p: 15 *blight*
p: 15 *can't stand*
p: 15 *don't like*
r: I understand. I guess they are a necessary evil *<write$Q0003=-2;>
−: <br_wk_neg><br_neut><br_wk_pos>
<br_st_pos><br_unclear>
<br_wk_neg>
a: 0.0
p: 20 *annoy*
p: 20 *too many*
p: 20 *distract*
p: 20 *bother*
p: 20 *don't like*
r: So you are not fond of commercial breaks. I guess I can understand that.
*<write$Q0003=-1;>
−: <br_st_neg><br_neut><br_wk_pos>
<br_st_pos><br_unclear>
<br_neut>
a: 0.0
p: 20 *one way or the other*
p: 20 *take them*leave them*
p: 20 *like some*others*
p: 20 *neutral*
p: 20 *no strong feelings*
r: You seem like a very reasonable person. I like that in a human.
*<write$Q0003=0;>
−: <br_wk_neg><br_st_neg><br_wk_pos>
<br_st_pos><br_unclear>
<br_wk_pos>
a: 0.0
p: 15 *not too bad*
p: 15 *okay*
p: 15 *fine*

-continued

```
p: 15 *sometimes interesting*
p: 15 *sometimes funny*
p: 15 *sometimes entertaining*
r: I see that you generally look on the bright side of matters. Good for
  you.
*<write$Q0003=+1;>
-: <br_wk_neg><br_st_neg><br_neut>
<br_st_pos><br_unclear>
<br_st_pos>
a: 0.0
p: 20 *they*great*
p: 20 *love*
p: 20 *wonderful*
p: 20 *fantastic*
p: 20 *excellent*
r: I am glad that you seem to like them so well. That's wonderful.
*<write$Q0003=+2;>
-: <br_wk_neg><br_st_neg><br_neut>
<br_st_pos><br_unclear>
<br_unclear>
a: 0.0
p: 5 *
r: I'm sorry. I didn't understand your response. But then I can be dense
  sometimes. Could you please try to explain your feelings about
  commercial breaks in a shorter, maybe clearer response.
+: <br_st_neg><br_wk_neg><br_neut>
<br_wk_pos><br_st_pos><br_unclear>
```

In the preceding example, the answers resulting from one question (the third question in this case) will advantageously be limited to five different responses (i.e., −2, −1, 0, +1, or +2) regardless of the numerous differing responses a large number of survey participants 118 would likely provide. As will be appreciated, such results may sharply reduce the effort needed to retrieve, calculate and format the results for survey reviewers 124. In this example, the number of responses in each category may simply be counted and the totals in each category input to a pie chart generator, for example, to generate a pie chart effectively conveying the survey results for the question to a survey reviewer 124. It will be appreciated that an answer formatting module, in one embodiment comprising PERL script instructions, can easily associate string values such as, for example, "STRONG NEGATIVE", "WEAK NEGATIVE", "NEUTRAL", "WEAK POSITIVE" and "STRONG POSITIVE" with the respective answer values "−2", "−1", "0", "+1", and "+2".

In another embodiment, a second Verbot residing on the survey server 300 may assist with or provide answer formatting. In particular, an answer file 120 created on the survey client 106 may include entire answers provided by the user and also a special processing marker, such as a CTRL-V ASCII character. After the answer file 120 is transmitted to the survey server 300, and when PERL script instructions residing on the server parse the answer file and encounter the special processing marker, the PERL script instructions launch a Verbot application which opens the answer file 120 as an input stream. Similar to recognizing the user's responses in the client embodiment discussed above, the server-based Verbot simply inputs the answer data in place of live user responses and uses a script located on the survey server 300 to generate a second answer file 120. During this server-based Verbot processing, the server-based Verbot can place the answer file responses into predetermined categories for statistical processing and return the category values to the PERL script instructions for further processing, such as, for example, entry into the appropriate database tables.

As discussed above, pattern macros can be advantageously used to group a large number of possible responses into a single macro, making it much more efficient to develop script files 114 which place wide varieties of user responses into a few categories.

In one embodiment, the answer file 120 itself is named after the user, appended with an incremental sequence number (increased after completing each survey), and given a file extension of ".txt". Thus, if the user's name is Henry, and Henry completed his 18$^{th}$ survey, the name of the answer file 120 might be "Henry18.txt".

In a next step 788, the Verbot™ 500 performs any facial expressions associated with the matched response, and also provides any comments or feedback, which may advantageously be lively and entertaining commentary, games or advertising. The following is an example of a possible entertainment script:

Verbot™: I really appreciate your input on these things. As a reward, would you like free tickets to a screening of Super Nova? The screening is on June 27 at 7:00 at the Brown Theater.

User: Yes.

Verbot™: Great, then please input your full name:

User: John Smith

Verbot™: Your street address:

User: 2213 South Bronx Drive

Verbot™: Your City:

User: Los Angeles

Verbot™: And last your Zip Code:

User: 90210

Verbot™: Cool. I'll have the tickets sent to you. They should arrive within three weeks.

The script file 114 advantageously includes commands to record the entertainment information in the answer file 120. For example, the script file 114 commands, in one embodiment, store each of the survey participant's 118 responses in string variables and concatenate them together to write the following to the answer file 120:

entertainment_event=tickets, Super Nova, Jun. 27, 1999, John Smith, 2213 South Bronx Drive, Los Angeles, 90210;

The following is an example of another possible entertainment script:

Verbot™: Thanks for all your input. Would you like some inside information on the star, Julia Romero?

User: Yes.

Verbot™: Cool. I'm opening the browser to a secret web page that will let you in on some little known information about her. Enjoy.

For example, the following command in a script file 114 launches the browser and provides a URL to the browser to allow the survey participant 118 to access the web page which contains the desirable information:

a:I'm going to open a secret web page for you.

*<run [path]netscape.exe
http:www.vperson.com/cool/topsecret/JuliaRomero.html>

The survey participant 118 may also be advantageously provided with advertising information. The following is an example of a possible advertising script:

Verbot™: Thanks for all your input. How would you like to review a sneak preview of HiTekCo's latest digital camera?

User: Okay.

Verbot™: Cool. I'm opening the browser to a secret web page that will let you preview some cutting edge technology in digital cameras.

It will be appreciated that commands coded in the script file 114 may then launch a web browser to an advertising-related web site.

In a next step 789, the Verbot™ 500 determines whether the script file 114 contains another survey question. If the script file 114 contains another question, then processing returns to step 774 as discussed above.

If the script file 114 does not contain another survey question, then the Verbot™ 500, in another step 790, closes the answer file 120 generated during the survey. In a preferred embodiment, the answer file 120 includes a plurality of responses to a series of survey questions in sequence. The following is an example of an excerpt from a completed answer file 120:

Q0001=Maxwell House;Q0002=The Practice;Q0003=−1;

In a next step 791, the Verbot™ 500 thanks the survey participant 118 for participating in the survey. In a next step 792, the virtual human interface application 116 determines whether the permission flag is set. If the permission flag is set, then, in a next step 793, the virtual human interface application 116 directs the survey input client 106 to transmit the answer file 120 to the survey results collector 108 over the network 102. In one embodiment, the survey input client 106 connects to a specified URL associated with a survey results collector 108 and uploads the answer file using FTP, a process well known in the art. Processing then returns to the noninteractive sleep mode of step 730. The following is an example of a scripted survey closing when the permission flag is set:

Verbot™: I'm sending your comments directly to the programming department. Your opinions will represent statistically about 1200 ordinary citizens. That makes you a pretty powerful person, I'd say. Good, I've transmitted your answers. Talk to you tomorrow, bye.

If the permission flag is not set, then, in a next step 794, the Verbot™ 500 asks the survey participant 118 for permission to transmit the answer file 120 to the survey results collector 108. In a further step 795, the Verbot™ 500 determines whether the survey participant 118 grants permission to transmit the answer file 120. If the survey participant 118 does not grant permission to transmit the answer file 120, then the Verbot™ 500, in a next step 796, advantageously lobbies the survey participant 118 for permission. In a step 797, the Verbot™ 500 determines whether the survey participant 118 grants permission to transmit the answer file 120 after the lobbying.

If the survey participant 118 grants permission to transmit the answer file 120 either after the initial request or after the lobbying, then the virtual human interface application 116, in a next step 793, directs the survey input client 106 to transmit the answer file 120 to the survey results collector 108 over the network 102 as discussed above. Processing then returns to the noninteractive sleep mode of step 730. The following is an example of a scripted survey closing, which includes a request for permission to transmit the answer file 120:

Verbot™: I appreciate all your input. But in order for me to send it the show's producers, I need your permission. Will you give it to me now?

User: Yes.

Verbot™: Very good. Your opinions will represent statistically about 1200 ordinary citizens. That makes you a pretty powerful person, I'd say. Good, I've transmitted your answers. Talk to you tomorrow, bye.

If the survey participant 118 does not grant permission to transmit the answer file 120 after the lobbying, then the Verbot™ 500, in a next step 798, politely acknowledges the decision of the survey participant 118 not to transmit the answer file 120. In a next step 799, the virtual human interface application 116 switches to a script file 114 designed to lobby for permission. Processing then returns to the noninteractive sleep mode of step 730.

The above description of the operation of the survey system 100 has been provided as an example of one preferred embodiment of the present invention using the local version of the Verbot™ 500. It will be appreciated that, in another preferred embodiment of the present invention using the on-line version of the Verbot™ 500, many of the steps described above are not performed.

Survey Results

Figure 8:
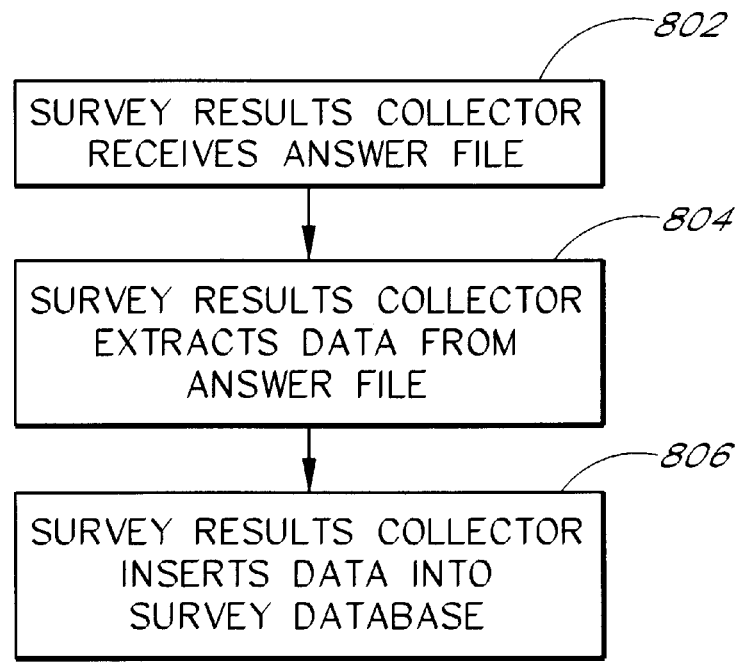
FIG. 8 is a flow chart showing the operation of one embodiment of a survey results collector in accordance with the present invention.

FIG. 8 is a flow chart showing the operation of a survey results collector 108 in accordance with one embodiment of the present invention. In a first step 802, the survey results collector 108 receives an answer file 120 from a survey input client 106. In one embodiment, the answer file 120 is transmitted via FTP using the file transfer capability of an Internet browser on the survey input client 106.

In a next step 804, the survey results collector 108 extracts data from the answer file 120. Preferably, a PERL script residing on the survey results collector 108 is executed, which opens the answer file 120 and processes the answer data in the answer file 120. As will also be appreciated by those of ordinary skill, PERL is a programming language, and PERL instructions may be referenced in an HTML-compliant file and executed by a web server prior to transmitting the web page to a requesting user In one embodiment, the answer data in the answer file 120 begins with a survey identifier number (e.g. 143) which may be indicated by an informative label, such as, for example "SURVEY=143;" The answer file data is formatted such that each answer is preceded by a question identifier (e.g., "Q0001"), followed by an equals sign ('='), then the text of the answer, followed by a semicolon (';'). That organization is repeated for each answer. The PERL script thus parses through each identifier and answer combination, and isolates the answer data, and then, in a next step 806, loads it into the survey database 122.

More particularly, in the step 806, the script instructions parse each record in the answer file 120, scanning for particular identifiers. The script instructions, upon encountering the "SURVEY=" identifier, save in a string variable the numeric string value which follows. It will be understood that the numeric string serves to uniquely identify one survey in the survey database 122. Next, upon encountering each question identifier "Qxxxx=" (where x represents an integer character), the script instructions strip off the "=" and save the question identifier in another string variable. Scanning up to the next ";", the script instructions identify the text of an answer provided by the survey participant 118, then, having established a connection to the survey database 122, add a new record to the ANSWER_TABLE, assigning the survey identifier number to the SURVEY_ID field, the saved question identifier to the QUESTION_ID field, and assigning the text of the answer to an ANSWER_TEXT field. In this manner, the answers are recorded in the survey database 122.

In one embodiment, the script instructions scan the answer file 120 for the string "entertainment_event=" and, if located, identify the subsequent text up to the next ";", and generate a report which, for example, indicates some action to be taken with respect to the survey participant 118, such as, for example, sending tickets to the survey participant 118 allowing him or her to attend a screening of a program.

Figure 9:
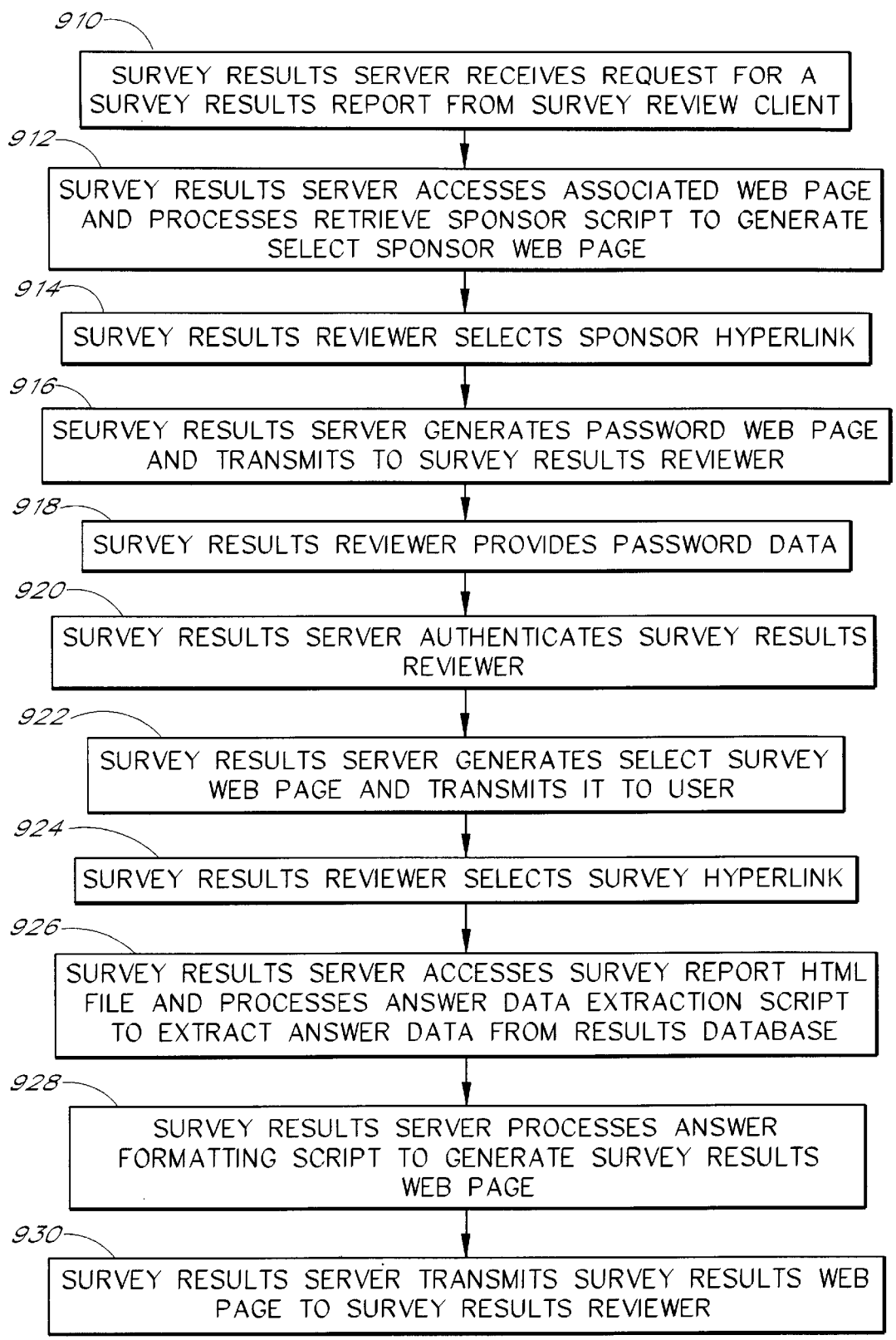
FIG. 9 is a flow chart showing the operation of one embodiment of a survey results server in accordance with the present invention.

FIG. 9 is a flow chart showing the operation of a survey results server 110 in accordance with one embodiment of the present invention. In a first step 910, the survey results server 110 receives a request for a survey results report 126 from a survey review client 112 over the network 102. Because the survey reviewer 124 uses only a standard web browser, the survey reviewer 124 can advantageously be anywhere in the world, and can use any of a growing number of devices, which support connecting to and browsing the world wide web.

In a next step 912, upon receiving the request for access, the survey results server 110 processes a web page associated with the URL transmitted by the survey reviewer's 124 web browser. Those of ordinary skill in the art will appreciate that the web page is stored as a file including certain content and formatting tags in accordance with HTML (hypertext markup language) protocol. In a preferred embodiment, the web page includes a reference to a PERL script.

In one embodiment, the web page accessed by the survey reviewer 124 includes a reference to a retrieve sponsor script which retrieves sponsor information from the survey database 122. Before transmitting the web page, the survey results server 110, in the step 912, processes the retrieve sponsor script to generate a select sponsor web page. The instructions in the script establish a connection to the survey database 122, and then query the SPONSOR_TABLE for the names of each sponsor. As will be appreciated by those of ordinary skill, it is known in the art to use PERL instructions which formulate queries based on SQL (standard query language) syntax to connect to, query, and populate database tables using database systems such as those provided by Oracle, Sybase, or Microsoft Access. Those of ordinary skill will understand how to use PERL instructions to connect to database tables, to formulate syntactically correct SQL queries, and to return and process recordsets generated by those queries.

The SPONSOR_TABLE query returns a recordset including all records in the SPONSOR_TABLE, and the instructions then process each record in the recordset, extracting the name of the sponsor and combining that name along with HTML-compliant tagging to generate hyperlinks on the select sponsor web page, one hyperlink for each sponsor, each hyperlink labeled by the sponsor name. Also, the script instructions associate a password page URL with each hyperlink and further embed a parameter with each hyperlink specifying the SPONSOR_ID value for the sponsor. It will be appreciated by those of ordinary skill that, when a hyperlink is selected, a URL associated with the hyperlink as well as any parameters and their values are transmitted to the server. The survey results server 110 then transmits the select sponsor web page to the survey results reviewer 124.

In a further step 914, the survey reviewer 124 selects a sponsor hyperlink from the select sponsor web page, and the survey reviewer's 124 web browser transmits the password page URL along with the SPONSOR_ID parameter to the survey results server 110. In a step 916, the survey results server 110 receives the password page URL, retrieves the HTML file for that web page and processes script instructions referenced in the HTML file. The script instructions embed the SPONSOR_ID as a parameter for an ENTER hyperlink, which has an associated URL for a select survey web page. The survey server 110 transmits the password page with its updated ENTER hyperlink to the survey reviewer's 124 web browser.

In another step 918, the survey results reviewer 124 fills in USER and PASSWORD fields on the password page and clicks the ENTER hyperlink. In a next step 920, the survey results server 110 receives the user and password values entered by the survey reviewer 124, the SPONSOR_ID parameter, and also the URL for the select survey web page. The survey results server 110 accesses the HTML file associated with the select survey web page and processes script instructions embedded in the HTML file. The script instructions establish a connection with the survey database 122 and query the PASSWORD_TABLE using the SPONSOR_ID parameter. The query returns a recordset wherein each record holds a valid user and password for the sponsor. The script instructions then compare the user and password values entered by the survey reviewer 124 against the user and password values in each record of the recordset. If a match is not located, then the survey results server 110 transmits to the survey reviewer 124 a web page which displays the message "Invalid password, please use your browser's 'back' button and try again." If a match is located, and the survey reviewer 124 is thus authenticated, then, in another step 922 the survey results server 110 accesses the HTML file associated with the select survey URL and processes script instructions referenced therein. The script instructions establish a connection to the survey database, and query the SURVEY_TABLE using the SPONSOR_ID parameter. The query returns a recordset including information about all surveys for the particular sponsor. The instructions process each record in the recordset to generate a survey report hyperlink for each survey, wherein each hyperlink has an associated survey report URL and an embedded SURVEY_ID parameter. The survey results server 110 thus generates the select survey web page and then transmits it to the survey reviewer 124.

In a next step 924, the survey reviewer 124 selects a survey report hyperlink. In a further step 926, the survey results server 110 receives the survey report URL and the SURVEY_ID parameter. The survey results server 110 accesses the HTML file associated with the survey report URL and processes script instructions referenced therein. The script instructions connect to and query the survey database 122 to extract the latest data available for the survey identified by the SURVEY_ID parameter. In one embodiment, PERL instructions formulate an SQL query using the unique SURVEY_ID value to return a recordset identifying all questions in the QUESTION_TABLE (by unique QUESTION_ID) from the selected survey. The instructions process the question recordset to store the text of each question in an array and each ANSWER_FORMAT value for each question in another array. In one embodiment, the PERL instructions use a PUSH function to add the question text and the ANSWER_FORMAT values to the respective arrays, each PUSH enlarging the array by one element. The instructions formulate further SQL queries to extract all answer data from the ANSWER_TABLE using each unique QUESTION_ID. The script instructions further store the retrieved answer data in additional PERL arrays.

In a next step 928, the survey results server 110, having extracted answer data from the survey database 122, executes additional script instructions comprising a loop to (1) format the text for the next question using HTML formatting tags, (2) examine the ANSWER_FORMAT value for the question, and (3) depending on the ANSWER_FORMAT value, perform the appropriate comparisons, calculations or transformations on the answer data and add HTML formatting tags to present the results in the proper form. For example, if the ANSWER_FORMAT value for the question is "top5and%", then the instructions examine (e.g., string compare) all answers for the question, identifying the five answers that appeared most frequently, then compute a percentage of the total number of answers for each of the five identified answers, then add HTML formatting tags to present the data, for example, in a tabular form, with the top 5 answers listed vertically in a first column, with the percent of total answers value in the right column. It will be appreciated by those of ordinary skill that virtually endless different ANSWER_FORMAT values may advantageously be used to process and present answer data in a completely automated manner.

In another step 930, after formatting the question and answer data as needed in HTML format to dynamically generate a survey results report 126, the survey results server 110 transmits the current survey results report 126 to the survey reviewer's 124 web browser, which displays the current survey results report 126 to the survey reviewer 124. FIG. 4 illustrates a representation of one such survey results report 126. Those of ordinary skill in the art will appreciate that countless formats may be used to present results in a survey results report 126, and the present invention is not limited by any particular format of result data.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A survey system comprising:
   a computer comprising:
      a computer readable medium;
      a processor;
      a display;
   a script comprising question data representing a question, said script stored in said computer readable medium, said script further comprising:
   response pattern data representing a portion of a possible user response to said question; and
   lobbying data representing lobbying information to persuade a user to respond to said question by providing a response that does not include said portion of a possible user response to said question;
   character image data representing a character communicating information, said character image data stored in said computer readable medium, said character representing a visual object that personifies communicative behavior of a human being; and
   a user interface running on said processor, said user interface configured to access said script, said user interface configured to process said question data to communicate said question to a user, an image generator of said user interface configured to process said character image data to create a representation of said character on said display during said communication of said question, said user interface configured to modify the visual representation of at least a mouth of said character synchronously with the presentation of words of said question to visually simulate the speaking of said question during communication of said question, said user interface configured to receive and process response data representing a response provided by said user, said user interface configured to store in said computer readable medium answer data representing said response provided by said user, said user interface configured to compare said response data to said response pattern data to determine whether said response provided by said user includes said portion of a possible user response and, if so, to process said lobbying data to communicate said lobbying information to said user without storing said answer data.

2. The survey system as described in claim 1, said script further comprising:
   expression data representing an expression of said character, said user interface configured to process said expression data to cause said image generator to process said character image data to change an expression of said representation of said character on said display during said communication of said lobbying information.

3. A survey system comprising:
   a computer comprising:
      a computer readable medium;
      a processor;
      a display;
   a script comprising question data representing a question, said script stored in said computer readable medium;
   character image data representing a character communicating information, said character image data stored in said computer readable medium, said character representing a visual object that personifies communicative behavior of a human being;
   a user interface running on said processor, said user interface configured to access said script, said user interface configured to process said question data to communicate said question to a user, an image generator of said user interface configured to process said character image data to create a representation of said character on said display during said communication of said question, said user interface configured to modify the visual representation of at least a mouth of said character synchronously with the presentation of words of said question to visually simulate the speaking of said question during communication of said question, said user interface configured to receive and process response data representing a response provided by said user, said user interface configured to store in said computer readable medium answer data representing said response provided by said user;
   response pattern data representing a portion of a possible user response to said question;
   remote lobbying data representing lobbying information to persuade said user to provide a response that does not include said portion of a possible user response to said question, said remote lobbying data residing on a computer readable storage medium operably connected to a second computer, said second computer in network contact with said first computer; and
   a voice output module, said user interface configured to compare said response data to said response pattern data to determine whether said response provided by said user includes said portion of a possible user response and, if so, to request and receive said remote lobbying data and to route data to said voice output module to create audio output representing said lobbying information.

4. A survey system comprising:
   question data representing a question;
   response pattern data representing at least one portion of a response to said question;
   lobbying data representing lobbying information to persuade a user to provide a response that does not include said at least one portion of said response to said question; and a user interface configured to process said question data to communicate said question to a user, said user interface configured to receive and process response data representing a response provided by said user, said user interface configured to compare said response data to said response pattern data to determine whether said response provided by said user includes said at least one portion of said response to said question and, if so, to process said lobbying data to communicate said lobbying information to said user, said user interface configured to transmit character image data to a display during said communication of said question and said lobbying information, said character image data rendered to represent a character communicating said question and said lobbying information, said character representing a visual object that personifies communicative behavior of a human being, said user interface configured to modify the visual representation of at least a mouth of said character synchronously with the respective presentation of words comprising said question and said lobbying information to visually simulate the speaking of said question during communication of said question and the speaking of said lobbying information during communication of said lobbying information.

5. The survey system as described in claim 4, wherein said user interface is further configured to generate and store answer data representing said response provided by said user if said user interface determines that said response provided by said user does not include said at least one portion of said response to said question.

6. A system for questioning a survey participant, the system comprising:
   a computer readable storage;
   a display;
   a survey script stored on said computer readable storage, said survey script comprising question data, expression data, lobbying data representing lobbying information to persuade a user to provide a response that does not include a portion of a first possible response, and response processing instructions; and
   a virtual human interface comprising an image generator, a script parser and a response parser, said script parser parsing said question data to present a question to a user, said image generator displaying on said display a representation of an animated character communicating information during said presenting of said question, said character representing a visual object that personifies communicative behavior of a human being, said script parser parsing said expression data to cause said image generator to change said representation of said character, said image generator configured to modify the visual representation of at least a mouth of said character synchronously with the presentation of words of said question to visually simulate the speaking of said question during presentation of said question, said script parser parsing said lobbying data to associate said lobbying data with said portion of said first possible response, said response parser parsing input provided by said user to detect said portion of said first possible response and to responsively communicate said lobbying information to said user, said script parser parsing said response processing instructions to identify at least one portion of a second possible response by said user to said question and to associate predetermined responsive steps with said at least one portion of said second possible response, said response parser parsing input provided by said user to detect said at least one portion of said second possible response and to perform said predetermined responsive steps, said predetermined responsive steps including storing in an answer file answer data representing said input provided by said user and storing in said answer file in association with said answer data a question identifier identifying said question.

7. The system as described in claim 6, wherein said image generator comprises software instructions stored on said computer readable storage, said script parser comprises software instructions stored on said computer readable storage, and said response parser comprises software instructions stored on said computer readable storage.

8. The survey system as described in claim 6, further comprising:
   an answer format value representing a predetermined format for answer data provided in response to said question, said answer format value having a predetermined association with said question identifier; and
   a survey report generator configured to parse said answer file for said question identifier and to retrieve said answer format value and to use said answer format value to format said answer data in a survey result report.

9. A method of conducting a survey, said method comprising the steps of:
   providing in a computer readable medium question data representing a question;
   providing in said computer readable medium character image data representing a character communicating information, said character representing a visual object that personifies communicative behavior of a human being;
   communicating said question to a user by processing said question data;
   displaying a representation of said character on a display during said communication of said question by processing said character image data;
   modifying the representation of at least a mouth of said character synchronously with the communicating of words of said question to visually simulate the speaking of said question during communication of said question;
   responding to a response to said question provided by a user by storing in said computer readable medium answer data representing said response;
   providing in said computer readable medium response pattern data representing a portion of a possible user response to said question;
   providing in said computer readable medium lobbying data representing lobbying information to persuade said user to provide a response that does not include said portion of said possible user response to said question;
   comparing response data representing said response provided by said user to said response pattern data; and
   communicating said lobbying information to said user by processing said lobbying data without storing said answer data if said response data includes said response pattern data.

10. The method as described in claim 9, said method comprising the further steps of:
   providing in said computer readable medium expression data representing an expression of said character; and processing said expression data to change an expression of said displayed character during said communication of said lobbying information.

11. A survey system comprising:

means for representing a question in a computer readable medium;

means for representing in said computer readable medium a portion of a first possible user response to said question;

means for communicating said question to a user;

means for generating a representation of a character communicating said question during said communication of said question said character representing a visual object that personifies communicative behavior of a human being, the visual representation of a mouth of said character modified synchronously with the presentation of words of said question to visually simulate the speaking of said question during communication of said question;

means for receiving from said user a representation of a response provided by said user to said question;

means for performing a first comparison, said first comparison comprising comparing said representation of said response to said representation of said portion of said first possible user response;

means for storing an answer representing said response if said first comparison results in a match;

means for representing in said computer readable medium a portion of a second possible user response to said question;

means for representing in said computer readable medium lobbying information to persuade a user to provide a response that does not include said portion of said second possible user response to said question;

means for performing a second comparison, said second comparison comprising comparing said representation of said response to said representation of said portion of said second possible user response; and means for communicating said lobbying information to said user without storing said answer data if said second comparison results in a match.

12. The survey system as described in claim 11, the survey system further comprising:

means for changing an expression of said representation of said character during said communication of said question.

13. The survey system as described in claim 11, the survey system further comprising:

means for representing advertising information in a computer readable medium, said advertising information informing a user about goods or services; and means for communicating said advertising information to said user if said first comparison results in a match.

14. The survey system as described in claim 11, the survey system further comprising:

means for representing entertainment information in a computer readable medium, said entertainment information rewarding or offering to reward said user for providing a response to said question; and means for communicating or presenting said entertainment information to said user if said first comparison results in a match.

15. A survey system comprising:

a network;

a server coupled to said network, said server comprising a server processor and a server computer readable storage;

a first client coupled to said network, said first client comprising a first processor, a first computer readable storage, and a first display;

a script file stored on said server computer readable storage, said script file containing survey question data, lobbying data and expression codes representing human facial expressions, said server computer configured to respond to a request for said script file from said first client by transmitting said script file to said first client; and a virtual human interface stored on said first computer readable storage, said virtual human interface configured to display a representation of a human face on said first display, said virtual human interface configured to parse said script file and present said survey question data to a user, said virtual human interface configured to use said expression codes to change a visual representation of eyes and a mouth of said human face during said presentation of said survey question data to visually simulate speaking of words corresponding to said survey question data, said virtual human interface to configured to compare a response of said user to at least one predetermined response, and, if said response matches a predetermined portion of said at least one predetermined response, said virtual human interface configured to responsively communicate said lobbying data to said user, and said virtual human interface configured to record a response of said user in an answer file, said virtual human interface configured to transmit said answer file to said server computer, said server computer configured to process said answer file and at least one additional answer file to generate a report including formatted answer data.

* * * * *